United States Patent
Murata et al.

(10) Patent No.: US 6,685,997 B1
(45) Date of Patent: Feb. 3, 2004

(54) VARNISH COMPOSITION AND LIQUID-CRYSTAL DISPLAY ELEMENT

(75) Inventors: Shizuo Murata, Chiba (JP); Haruo Kato, Chiba (JP); Satoshi Tanioka, Chiba (JP); Kumiko Fukui, Chiba (JP); Hiroshi Ono, Chiba (JP); Itsuo Shimizu, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/701,842

(22) PCT Filed: Apr. 7, 2000

(86) PCT No.: PCT/JP00/02275

§ 371 (c)(1),
(2), (4) Date: Dec. 5, 2000

(87) PCT Pub. No.: WO00/61684

PCT Pub. Date: Oct. 19, 2000

(30) Foreign Application Priority Data

Apr. 9, 1999 (JP) ............................................. 11-102475

(51) Int. Cl.$^7$ ................................................ C09K 19/00
(52) U.S. Cl. .............................. 428/1.2; 428/1; 528/353
(58) Field of Search ........................ 428/1.1, 1.2, 1.25, 428/1.26; 528/353; 524/104

(56) References Cited

U.S. PATENT DOCUMENTS

| | | | |
|---|---|---|---|
| 5,046,822 A | * 9/1991 | Matsuda et al. | 428/1 |
| 5,376,302 A | 12/1994 | Coates et al. | |
| 5,783,656 A | * 7/1998 | Kimura et al. | 428/1 |
| 5,907,005 A | * 5/1999 | Shimizu | 524/104 |
| 6,316,574 B1 | * 11/2001 | Tanioka et al. | 428/1.1 |

FOREIGN PATENT DOCUMENTS

| | | |
|---|---|---|
| EP | 492668 | 7/1992 |
| EP | 575791 | 12/1993 |
| JP | 4-12325 | 1/1992 |
| JP | 4-190328 | 7/1992 |
| JP | 541912 | 5/1993 |
| JP | 10-133160 | 5/1998 |
| JP | 10-161134 | 6/1998 |
| JP | 10-168189 | 6/1998 |
| JP | 11-264981 | 9/1999 |
| JP | 2000-98394 | 4/2000 |
| WO | 93/09202 | 5/1993 |
| WO | 99/33902 | 7/1999 |
| WO | 99/33923 | 7/1999 |
| WO | 99/34252 | 7/1999 |

* cited by examiner

*Primary Examiner*—Mark F. Huff
*Assistant Examiner*—Jennifer R. Sadule
(74) *Attorney, Agent, or Firm*—McDermott, Will & Emery

(57) ABSTRACT

Provided is a varnish composition which can achieve well-balanced electrical characteristics such as a residual charge, a voltage-holding ratio and image sticking and various characteristics such as a pretilt angle, a coating property and an aligning property, which are desired to a liquid crystal alignment film which is prepared therefrom. The above varnish composition comprises a polymer component comprising a polyamide acid represented by Formula (1), a polyamide represented by Formula (2) or the polyamide represented by Formula (2) and a soluble polyimide represented by Formula (3), and a solvent, wherein the above polymer component contains 1 to 60% by weight of the polyamide represented by Formula (2), and the above varnish composition contains 0.1 to 40% by weight of the polymer component:

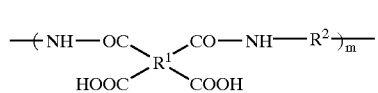

(1)

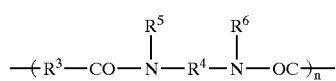

(2)

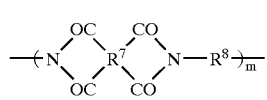

(3)

20 Claims, 3 Drawing Sheets

VARNISH COMPOSITION AND LIQUID-CRYSTAL DISPLAY ELEMENT

TECHNICAL FIELD

The present invention relates to a varnish composition, more specifically to a varnish composition which is suited as a material for preparing a liquid crystal alignment film for a liquid crystal display as well as an insulating film and a protective film related to other electronic material fields.

BACKGROUND ART

At present, liquid crystal displays using nematic liquid crystal are mainly used, and well known are, for example, a matrix TN display in which a liquid crystal molecule is twisted by 90°, an STN display in which a liquid crystal molecule is twisted by 180° or more and a liquid crystal display of a so-called TFT mode in which a thin film transistor is used. Further, in recent years, an IPS (in-plane switching) type liquid crystal display of a lateral electric field type which is improved in a visual angle characteristic has been put to practical use.

A progress in a liquid crystal display depends largely on such modes, and in addition thereto, it is important to develop materials related to a liquid crystal display. In line with such object, an improvement in the materials has actively been investigated.

One of them is the development of an aligning agent for a liquid crystal alignment film. This is because a liquid crystal alignment film exerts a great influence on a display quality of a liquid crystal display and therefore an improvement thereof is further more desired in recent years.

At present, a practical liquid crystal alignment film is obtained in the form of a polyimide film by turning polyamic acid which is mainly an aligning agent component into a film and then turning it into imide or turning a soluble polyimide base polymer into a film. According to prior literature, various polymer base alignment films other than the above have been investigated, but most of them have problems on a heat resistance, a chemical (liquid crystal) resistance, electrical properties, display characteristics and alignment stability and therefore have scarcely been put to practical use.

In order to overcome this, investigated are films other than polyimide, for example, films using polyamide or polyamide having a structure in which H in an N—H portion of polyamide is substituted with other substituent, but they still have problems on an aligning property of the liquid crystal alignment film and electrical characteristics of the liquid crystal display.

Further, an aligning agent containing polyamide acid and polyamide is investigated as well, but an alignment film obtained from this has problems particularly on image sticking, a residual charge or a retention.

Thus, conventional liquid crystal alignment films have not been able to satisfy required characteristics synthetically with good balance.

DISCLOSURE OF THE INVENTION

An object of the present invention is to solve the defects of the conventional techniques described above and provide a varnish composition which can achieve well-balanced electrical characteristics such as a residual charge, a voltage-holding ratio and image sticking and various characteristics such as a pretilt angle, a coating property and an aligning property, which are desired to a liquid crystal alignment film.

Some of the problems described above are further explained next. First, with respect to the electrical characteristics, particularly a image sticking phenomenon is a problem in a TFT liquid crystal display, and therefore solution thereof is first required.

That is, caused in a TFT liquid crystal display is a so-called "image sticking phenomenon" that an image remains on a screen even after voltage applied is cut off.

This phenomenon is considered to be brought about by a lag on an element, which originates in a charge accumulated due to a DC voltage component applied. When displaying a dynamic picture, the lag thus produced brings about a so-called "tailing phenomenon" that a preceding image remaining as a lag is carried over and displayed on a subsequent image or a phenomenon that a trace of a preceding image remains after a scene is switched over. Accordingly, these defects have to be removed.

Usually employed as a method for evaluating lag is, as described later, a method based on a difference in a voltage of hysteresis in a C-V curve (capacitance-voltage curve). However, evaluation results obtained by this method sometimes do not meet an actual lag phenomenon in a display element, and therefore it has been concluded in the present invention to carry out visual evaluation in addition to evaluation according to the C-V curve mentioned above.

Next, the electrical characteristics have problems as well in terms of a voltage-holding ratio, and solution thereof is required.

That is, an image is displayed by applying voltage to a liquid crystal display element, but as referred to FIG. 3 shown later, the above voltage is applied by repeating a series of a cycle comprising application of voltage (ON), OFF after short time passes, application of reverse voltage after fixed time passes and OFF after short time passes, thus the voltage is not continuously applied.

In order to optimize a picture, the voltage is preferably maintained at the same level as that in applying even when turning the applied voltage to OFF. In practice, however, this is impossible, and a reduction in the voltage to some extent is unavoidable. If this reduction in the voltage is great, a problem grows large particularly in TN type TFT and IPS elements. For example, while the voltage is turned to OFF and then the reverse voltage is turned to ON, the liquid crystal molecules lying in a horizontal direction in a TFT element of a TN type tilt to a vertical direction in the case where the liquid crystal used is an n type, and the liquid crystal molecules standing in a vertical direction tilt in a horizontal direction in the case of the p type, so that the contrast of the picture decrees.

Accordingly, these defects have to be removed by improving a liquid crystal material, a structure of a display element and an alignment film material, but it has not yet sufficiently been achieved.

Further, a problem on production of domains of liquid crystal is present in relation to a pretilt angle. That is, rising directions of the liquid crystal molecules have to be the same in a display element, but if a part where the rising directions become reverse is present, stripes called a domain are produced on the screen and may damage the display characteristics.

Such phenomenon is liable to be caused by a too small pretilt angle of liquid crystal molecules. Accordingly, in order to avoid this, various conditions related to a liquid crystal display have to be controlled so that the pretilt angle of the liquid crystal molecules is controlled to a fixed angle or more, and the rise directions thereof become the same.

The pretilt angle described above falls suitably in a range of 3 to 12°, preferably 3 to 8° in the case of a TN type TFT element, and because liquid crystal molecules move in a horizontal direction in the case of an IPS type element, the pretilt angle does not have to be specifically enlarged and may be usually about 1°.

In order to achieve the object of the present invention, the present invention comprises the following structures.

(1) A varnish composition comprising a polymer composition comprising a polyamic acid represented by Formula (1):

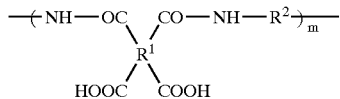

(wherein $R^1$ represents a tetravalent organic residue originating in tetracarboxylic acids which is given by removing carboxyl groups, and $R^2$ represents a divalent organic residue originating in diamines which is given by removing amino groups) and a polyamide represented by Formula (2):

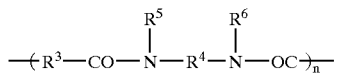

(wherein $R^3$ represents a divalent organic residue originating in dicarboxylic acids which is given by removing carboxyl groups; $R^4$ represents a divalent organic residue originating in diamines which is given by removing amino groups; at least one of $R^5$ and $R^6$ represents a group selected from monovalent organic groups, and the other presents hydrogen or a group selected from monovalent organic groups, but when both are groups selected from the organic groups, they may have the same structure or different structures), and a solvent for dissolving this polymer composition, wherein the polymer composition described above contains 1 to 60% by weight of the polyamide represented by Formula (2) based on the polymer composition, and the varnish composition described above contains 0.1 to 40% by weight of the polymer composition.

(2) A varnish composition comprising a polymer composition comprising a polyamic acid represented by Formula (1):

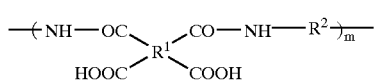

(wherein $R^1$ represents a tetravalent organic residue originating in tetracarboxylic acids which is given by removing carboxyl groups, and $R^2$ represents a divalent organic residue originating in diamines which is given by removing amino groups), a polyamide represented by Formula (2):

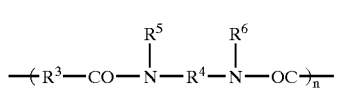

(wherein $R^3$ represents a divalent organic residue originating in dicarboxylic acids which is given by removing carboxyl groups; $R^4$ represents a divalent organic residue originating in diamines which is given by removing amino groups; at least one of $R^5$ and $R^6$ represents a group selected from monovalent organic groups, and the other represents hydrogen or a group selected from monovalent organic groups; and when both are groups selected from the organic groups, they may have the same structure or different structures) and a soluble polyimide represented by Formula (3):

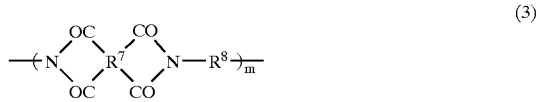

(wherein $R^7$ represents a tetravalent organic residue originating in tetracarboxylic acids which is given by removing carboxyl groups; $R^8$ represents a divalent organic residue originating in diamines which is given by removing amino groups; and at least one of $R^7$ and $R^8$ contains a group having a side chain group), and a solvent for dissolving this polymer composition, wherein the polymer composition described above contains 1 to 60% by weight of the polyamide represented by Formula (2) and the soluble polyimide represented by Formula (3) in total based on the polymer composition, and the varnish composition described above contains 0.1 to 40% by weight of the polymer composition.

(3) The varnish composition as described in the item (1) or (2), wherein the tetracarboxylic acids giving $R^1$ comprise an alicyclic tetracarboxylic acid as an essential component.

(4) The varnish composition as described in the item (1) or (2), wherein the tetracarboxylic acids giving $R^1$ comprise an alicyclic tetracarboxylic acid and, an aromatic tetracarboxylic acid or/and an aliphatic tetracarboxylic acid as essential components.

(5) The varnish composition as described in the item (3) or (4), wherein the alicyclic tetracarboxylic acid is cyclobutanetetracarboxylic dianhydride.

(6) The varnish composition as described in the item (4), wherein the alicyclic tetracarboxylic acid is cyclobutanetetracarboxylic dianhydride, and the aromatic tetracarboxylic acid is pyromellitic dianhydride.

(7) The varnish composition as described in the item (1) or (2), wherein the tetracarboxylic acids giving $R^1$ comprise cyclobutanetetracarboxylic dianhydride and butanetetracarboxylic dianhydride.

(8) The varnish composition as described in any of the items (1) to (7), wherein the diamines giving $R^2$ is a diamine comprising an aromatic structural unit alone or an aromatic structural unit and an aliphatic structural unit.

(9) The varnish composition as described in any of the items (1) to (7), wherein $R^2$ in Formula (1) is a divalent organic residue originating in a diamine which is given by removing an amino groups, represented by Formula (4):

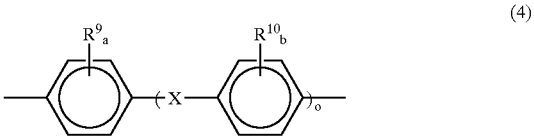

(wherein X represents a single bond, $-CH_2-$, $-CH_2CH_2-$, $-CH_2CH_2CH_2-$ or $-C(CH_3)_2-$; $R^9$ and $R^{10}$ each represent independently hydrogen or a lower alkyl group; a and b each are 1 to 2, and o is 0 to 3; and when o is 2 to 3, the respective X's may be the same as or different from each other).

(10) The varnish composition as described in any of the items (1) to (9), wherein the dicarboxylic acids giving $R^3$ are dicarboxylic acids comprising a unit selected from aromatic, alicyclic and aliphatic ones.

(11) The varnish composition as described in any of the items (1) to (9), wherein $R^3$ in Formula (2) is a divalent organic residue originating in a dicarboxylic acid which is given by removing carboxyl acid groups, represented by Formula (5):

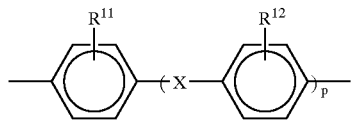

(5)

(wherein X represents a single bond, —$CH_2$—, —$CH_2CH_2$—, —$CH_2CH_2CH_2$— or —$C(CH_3)_2$—; $R^{11}$ and $R^{12}$ each represent independently hydrogen or a lower alkyl group; p is 0 to 3; and when p is 2 to 3, the respective X's may be the same as or different from each other) or Formula (6):

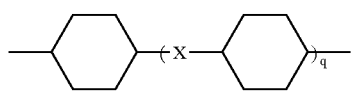

(6)

(wherein X represents a single bond, —$CH_2$—, —$CH_2CH_2$—, —$CH_2CH_2CH_2$— or —$C(CH_3)_2$—; q is 0 to 3; and when q is 2 to 3, the respective X's may be the same as or different from each other).

(12) The varnish composition as described in any of the items (1) to (11), wherein the diamines giving $R^4$ comprise diamines having a side chain having 3 or more carbon atoms.

(13) The varnish composition as described in any of the items (1) to (11), wherein $R^4$ in Formula (2) contains one selected from divalent organic residues originating in diamine which is given by removing an amino group, represented by Formula (7):

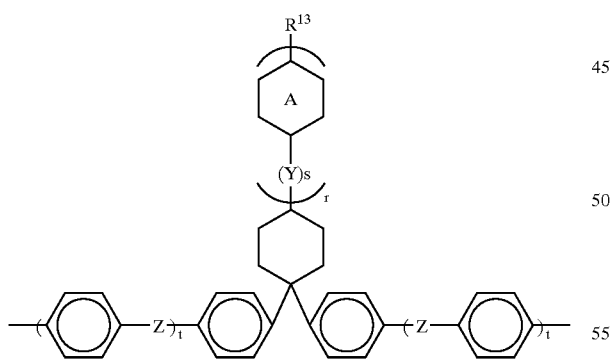

(7)

(wherein $R^{13}$ represents hydrogen or an alkyl group having 1 to 12 carbon atoms; Y represents a single bond or —$CH_2$—; a ring A represents a benzene ring or a cyclohexane ring; Z represents a single bond, —$CH_2$—, —$CH_2CH_2$— or oxygen; r is an integer of 0 to 3; s is an integer of 0 to 5; t is an integer of 0 to 3; when t is 2 to 3, the respective Z's may be the same as or different from each other; and (a) hydrogen(s) on the optional benzene ring or cyclohexane ring may be substituted with a lower alkyl group) or Formula (8):

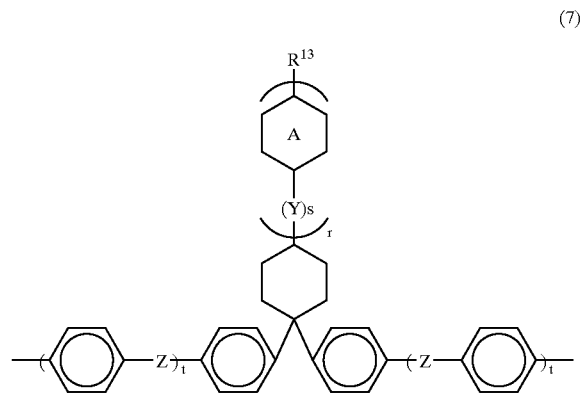

(8)

(wherein $X^1$ represents a single bond, —$CH_2$—, —$CH_2CH_2$— or oxygen; $R^{14}$ and $R^{15}$ each represent independently hydrogen or an alkyl group or perfluoroalkyl group having 1 to 12 carbon atoms, and at least one of them represents an alkyl group or perfluoroalkyl group having 3 or more carbon atoms; u is 0 to 3; when u is 2 to 3, the respective $X^1$'s may be the same as or different from each other; and (a) hydrogen(s) on the optional benzene ring may be substituted with a lower alkyl group).

(14) The varnish composition as described in any of the items (1) to (13), wherein at least one of $R^5$ and $R^6$ in Formula (2) is selected from the group of monovalent organic groups consisting of lower alkyl, cyclohexyl, phenyl, benzyl and cyclohexylmethyl.

(15) The varnish composition as described in any of the items (2) to (14), wherein the tetracarboxylic acids giving $R^7$ comprise alicyclic and/or aliphatic tetracarboxylic acids as an essential component.

(16) The varnish composition as described in any of the items (2) to (14), wherein the tetracarboxylic acids giving $R^7$ comprise an acid dianhydride selected from the group consisting of tricarboxycyclopentylacetic dianhydride, 3,4-dicarboxy-1,2,3,4-tetrahydronaphthalene-1-succinic dianhydride and butanetetracarboxylic acid dianhydride as an essential component.

(17) The varnish composition as described in any of the items (2) to (16), wherein the diamines giving $R^8$ comprise diamines having a side chain having 3 or more carbon atoms.

(18) The varnish composition as described in any of the items (2) to (16), wherein $R^8$ in Formula (3) contains one selected from divalent organic residues originating in diamine which is given by removing amino groups, represented by Formula (7):

(7)

(wherein $R^{13}$ represents hydrogen or an alkyl group having 1 to 12 carbon atoms; Y represents a single bond or —$CH_2$—; A represents a benzene ring or a cyclohexane ring; Z represents a single bond, —$CH_2$—, —$CH_2CH_2$— or oxygen; r is an integer of 0 to 3; s is an integer of 0 to 5; t is an integer of 0 to 3; when t is 2 to 3, the respective Z's may be the same as or different from each other; and (a)

hydrogen(s) on the optional benzene ring or cyclohexane ring may be substituted with a lower alkyl group) or Formula (8)

(8)

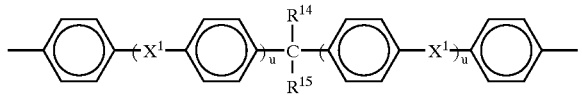

(wherein $X^1$ represents a single bond, —CH$_2$—, —CH$_2$CH$_2$— or oxygen; $R^{14}$ and $R^{15}$ each represent independently hydrogen or an alkyl group or perfluoroalkyl group having 1 to 12 carbon atoms, and at least one of them represents an alkyl group or perfluoroalkyl group having 3 or more carbon atoms; u is 0 to 3; when u is 2 to 3, the respective $X^1$'s may be the same as or different from each other; and (a) hydrogen(s) on the optional benzene ring may be substituted with a lower alkyl group).
(19) The varnish composition for a liquid crystal alignment film as described in any of the items (1) to (18).
(20) A liquid crystal display using the varnish composition as described in the item (19).
A TFT type liquid crystal display as described in item (20) prepared by applying a liquid crystal composition comprising liquid crystalline compounds represented by Formulas (9), (10) and (11) as principal components.

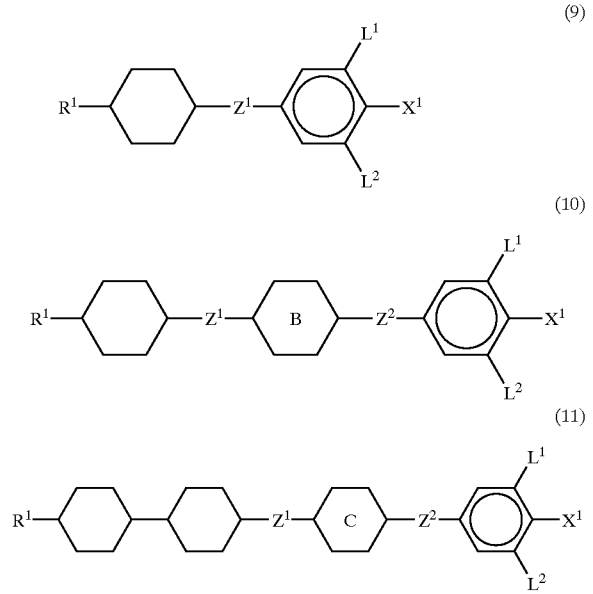

(wherein $R^1$ represents an alkyl group having 1 to 10 carbon atoms; (an) optional methylene group(s) which is/are not adjacent to each other in this group may be substituted with —O— or —CH=CH—, and (an) optional hydrogen atom(s) may be substituted with a fluorine atom; $X^1$ represents a fluorine atom, a chlorine atom, —OCF$_3$, —OCF$_2$H, —CF$_3$, —CF$_2$H, —CFH$_2$, —OCF$_2$CF$_2$H or —OCF$_2$CFHCF$_3$; $L^1$ and $L^2$ each represent independently a hydrogen atom or a fluorine atom; $Z^1$ and $Z^2$ each represent independently 1,2-ethylene, 1,4-butylene, —COO—, —CF$_2$O—, —OCF$_2$—, —CH=CH— or a single bond; a ring B represents trans-1,4-cyclohexylene, 1,3-dioxane-2,5-diyl or 1,4-phenylene in which a hydrogen atom on the ring may be substituted with a fluorine atom; a ring C represents trans-1,4-cyclohexylene or 1,4-phenylene in which a hydrogen atom on the ring may be substituted with a fluorine atom; and atoms constituting these compounds may be substituted with the isotopes).

BEST MODE FOR CARRYING OUT THE INVENTION

Figure 1:
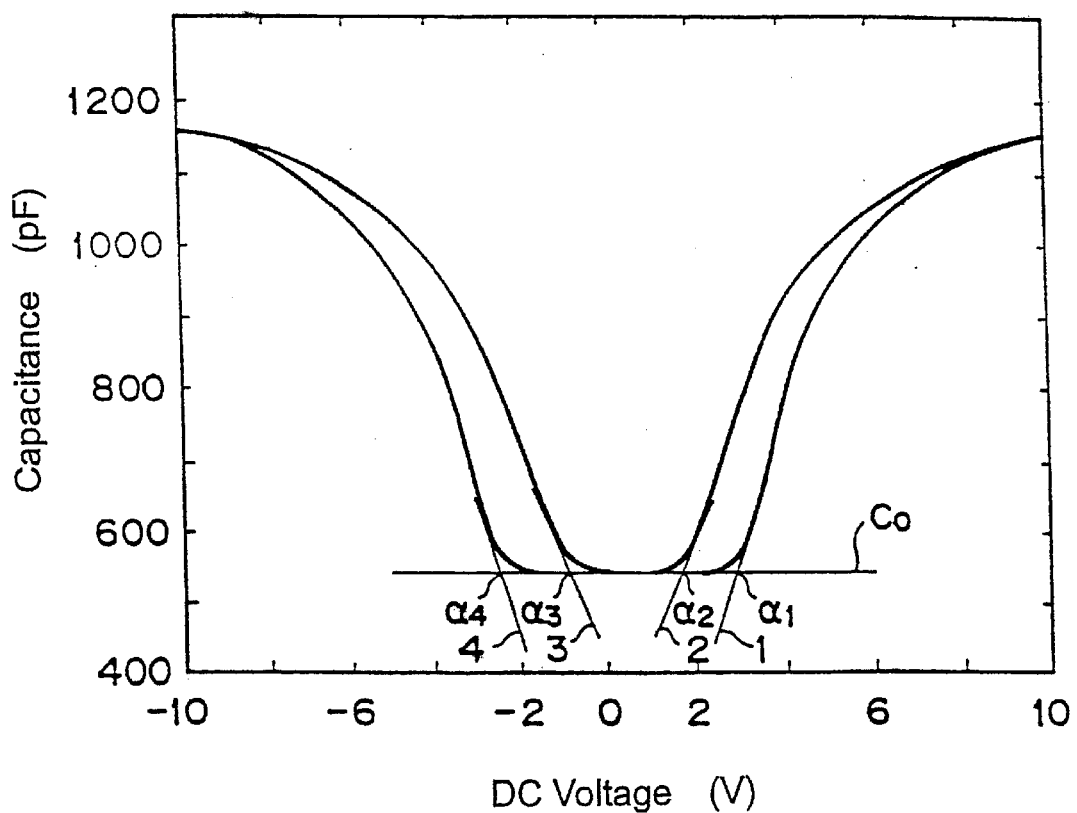
FIG. 1 shows a C-V hysteresis curve for measuring a residual voltage.

In the varnish composition of the present invention, the polyamic acid which is one of the polymer components is represented by Formula (1), and $R^1$ in the above formula is a tetravalent organic residue originating in tetracarboxylic acid or tetracarboxylic dianhydride (hereinafter referred to as tetracarboxylic acids in a general term) which is given by removing a carboxyl group or a corresponding acid anhydride group (hereinafter referred to as carboxyl groups in a general term).

Above $R^1$ is widely selected from publicly known tetravalent organic residues which are known in the sense described above. Among them, the tetravalent organic residues comprising at least a tetravalent organic residue originating in alicyclic tetracarboxylic acids and comprising a tetravalent organic residue originating in aromatic and/or aliphatic tetracarboxylic acids in combination therewith have an effect to elevate the display characteristics of the display element (for example, the residual charge and image sticking are reduced further more, and the voltage-holding ratio is increased), and therefore they are particularly preferred.

Further, the tetravalent organic residues comprising tetravalent organic residues originating in alicyclic tetracarboxylic acids used in combination with tetravalent organic residues originating in aliphatic tetracarboxylic acids can achieve an effect to reduce a current value of a liquid crystal display when the resulting varnish composition is used for an STN element, and therefore they are preferred.

Thus, $R^1$ comprises preferably at least the tetravalent organic residue originating in alicyclic tetracarboxylic acids, and a content thereof (mole ratio) is 100/0 to 10/90, preferably 70/30 to 10 to 90 in terms of (the tetravalent organic residue originating in alicyclic tetracarboxylic acids)/(the tetravalent organic residue originating in aromatic tetracarboxylic acids +the tetravalent organic residue originating in aliphatic tetracarboxylic acids).

The preceding tetravalent organic residue originating in aromatic tetracarboxylic acids has preferably such structure that it dos not contain an oxygen atom and a sulfur atom which are liable to exert an adverse effect on the electrical characteristics of the liquid crystal display.

Those which are usually known in such sense are widely suited to the tetracarboxylic acids giving $R^1$.

Among them, capable of being given as examples of the alicyclic tetracarboxylic acids are cyclobutanetetracarboxylic dianhydride, cyclopentane-tetracarboxylic dianhydride, bicycloheptane-tetracarboxylic dianhydride, bicyclo(2,2,2)-octo(7)-ene-2,3,5,6-tetracarboxylic dianhydride, cyclohexane-1,2,5,6-tetracarboxylic dianhydride, 3,4-dicarboxy-1,2,3,4-tetranaphthalene-l-succinic dianhydride, 3,3'-bicyclo-1,1',2,2'-tetracarboxylic dianhydride, 2,3,5- tricarboxycyclopentylacetic dianhydride, 5-(2,5-dioxotetrahydrofuranyl)-3-methyl-3-cyclohexene-1,2-dicarboxylic dianhydride, 1,3,3a,4,5,9b-hexahydro-5-tetrahydro-(2,5-dioxo-3-furanyl)-naphtho[1,2,-c]-furan-1,3-dione, 3,5,6-tricarboxy-norbornane-2-acetic dianhydride and 2,3,4,5-tetrahydrofurantetracarboxylic dianhydride, tetracyclo[6,2,1,$^{1,3}$,0$^{2,7}$]dodecane-4,5,9,10-tetracarboxylic dianhydride, and those obtained by partially substituting these compounds with lower alkyls such as methyl and/or ethyl. Among them, particularly preferred are cyclobutane-tetracarboxylic dianhydride, cyclopentanetetracarboxylic dianhydride and cyclohexanetetracarboxylic dianhydride.

Further, capable of being given as examples of the aromatic tetracarboxylic acids are pyromellitic dianhydride, 3,3',4,4'-diphenyltetracarboxylic dianhydride, 3,3',4,4'-benzophenonetetracarboxylic dianhydride, naphthaleic dianhydride (2,3,6,7-naphthaleic anhydride and the like), 3,3',4,4'-diphenylsulfonetetracarboxylic dianhydride, 3,3',4,4'-diphenylethertetracarboxylic dianhydride, 3,3',4,4'-dimethyldiphenylsilanetetracarboxylic dianhydride, 4,4'-bis(3,4-dicarboxyphenoxy)-diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoropropylidenediphthalic dianhydride, 3,3',4,4'-biphenyltetracarboxylic dianhydride, bis(phthalic acid)phenylsulphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride and bis(triphenylphthalic acid)-4,4'-diphenylmethane dianhydride. Among them, particularly preferred are dianhydrides constituted only from a phenyl group such as pyromellitic dianhydride, biphenyltetracarboxylic dianhydride and terphenyltetracarboxylic dianhydride, and tetracarboxylic dianhydrides constituted only from a phenyl group and an aliphatic group such as 2,2-diphenylpropanetetracarboxylic dianhydride.

Thus, a combination of pyromellitic dianhydride which is a suitable example of aromatic tetracarboxylic dianhydride with cyclobutane-tetracarboxylic dianhydride which is a suitable example of alicyclic tetracarboxylic dianhydrides can provide the most typical $R^1$ originating in tetracarboxylic acids.

Further, examples of the aliphatic tetracarboxylic acids used in combination with the alicyclic tetracarboxylic acids include ethane-tetracarboxylic dianhydride and butanetetracarboxylic dianhydride, but they are not preferably main components.

Next, $R^2$ in Formula (1) is a divalent organic residue originating in a diamine which is given by removing amino groups.

Above $R^2$ is widely selected from publicly known divalent organic residues. Among them, it is preferably a divalent organic residue which originates in a diamine comprising an aromatic structural unit alone such as phenyl or an aromatic structural unit and an aliphatic structural unit and which has such structure that it does not contain an oxygen-containing group such as an ester group or an ether group causing a reduction in the electrical properties of a liquid crystal display.

Diamines providing such residue are those represented by Formula (12):

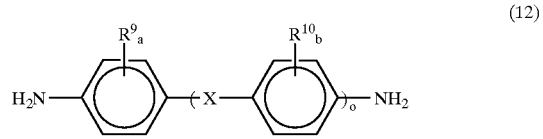

(wherein X represents a single bond, —CH$_2$—, —CH$_2$CH$_2$—, —CH$_2$CH$_2$CH$_2$— or —C(CH$_3$)$_2$—; $R^9$ and $R^{10}$ each represent independently hydrogen or a lower alkyl group; a and b each are 1 to 2, and o is 0 to 3; and when o is 2 to 3, the respective X's may be the same as or different from each other).

As follows are more specifically shown examples of the diamine represented by Formula (12).
When o is 0:
  p-Phenylenediamine, m-Phenylenediamine.
When o is 1:
  4,4'-Diaminodiphenylmethane, 4,4'-diaminodiphenylethane, 4,4'-diamino-1,3-diphenylpropane, 2,2-bis(4-aminophenyl)propane, 2,2-bis(4-aminophenyl)perfluoropropane, bis(4-amino-3-methylphenyl)methane, bis(4-amino-2-methylphenyl)methane, 1,2-bis(4-amino-3-methylphenyl)ethane, 1,3-bis(4-amino-3-methylphenyl)propane, 1,2-bis(4-amino-2-methylphenyl)ethane and 1,3-bis(4-amino-2-methylphenyl)propane.
When o is 2:
  1,4-Bis[(4-aminophenyl)methyl]benzene, 1,4-bis[(3-aminophenyl)methyl]benzene, 1,4-bis[(4-aminophenyl)ethyl]benzene, 1,4-bis[(3-aminophenyl)ethyl]benzene, 1,4-bis[(4-amino-3-methyl-phenyl)methyl]benzene and 1,4-bis[(4-amino-3-methylphenyl)ethyl]benzene.
When o is 3:
  Bis[(4-(4-aminobenzyl)phenyl]methane, bis[(4-(4-aminobenzyl)phenyl]methane, 2,2'-bis[(4-(4-aminobenzyl)phenyl]propane, bis[(4-(3-aminobenzyl)phenyl]methane, bis[(4-(3-aminobenzyl)phenyl]ethane, 2,2'-bis[(4-(3-aminobenzyl)phenyl]propane and 2,2'-bis[(4-(3-aminobenzyl)phenyl]hexafluoropropane.

The polyamic acids represented by Formula (1) are obtained by reacting the tetracarboxylic acids described above with the diamines as the starting materials, and in the above reaction, capable of being used in combination in addition to the starting materials described above include a dicarboxylic anhydride and/or a monoamine compound which form terminals of polyamic acids, and an aminosilicon compound and a diaminosilicon compound which is effective for increasing adhesion between the resulting liquid crystal alignment film and a substrate.

Specific examples of such aminosilicon compounds include paraaminophenyltrimethoxysilane, paraaminophenyltriethoxysilane, metaaminophenyltrimethoxy-silane, metaaminophenyltriethoxysilane, aminopropyltrimethoxysilane and aminopropyltriethoxysilane, and specific examples of the diaminosilicon compound include 1,3-bis(3-aminopropyl)-1,1,3,3-tetraphenyl-disiloxane, 1,3-bis(3-aminopropyl)-1,1,3,3-tetramethyldisiloxane and 1,3-bis(3-aminobutyl)-1,1,3,3-tetramethyldisiloxane.

The polyamide is N-substituted polyamide in which at least one of the hydrogen of N—H groups originating in diamine is substituted with $R^5$ or $R^6$ being a monovalent organic group in Formula (2) described above (hereinafter referred to merely as N-substituted PA).

The subjects of the present invention can be solved by using the polyamide having such structure in combination with the polyamic acid represented by Formula (1) described above. In order to solve the subjects, the above polyamide has to have a function to enlarge a pretilt angle of liquid crystal molecules. There are the measure to give a large pretilt angle which includes a method (first method) in which a group having a long chain is introduced into $R^5$ or $R^6$, a method (second method) in which a side chain group is introduced into a dicarboxylic acid or a method (third method) in which a side chain group is introduced into a diamine. The first method is liable to cause a problem on a liquid crystal resistance, and therefore the second method or the third method is preferred.

Various compounds which can enlarge a pretilt angle are known, and therefore the diamines are preferred. In particular, the diamines given in the present specification provide the stable pretilt angle and therefore are particularly preferably used.

The N-substituted PA described above can be obtained according to two methods shown below. One of them is a method in which dicarboxylic acid is reacted with a diamine compound in which H of an N part is substituted in advance with $R^5$ and/or $R^6$ being an organic group, and the other is a method in which dicarboxylic acid is reacted with a diamine compound and H of an N part in the polyamide thus obtained is substituted with $R^5$ and/or $R^6$.

Any of the methods described above can be applied, but the latter is preferred since it has an excellent reactivity and raises a molecular weight of the resulting polymer, which makes it possible to avoid the defect caused by shaving of the film in the subsequent rubbing step for providing an aligning property, or by disordering of liquid crystals.

The preceding dicarboxylic acid giving $R^3$ may be those belonging to any group of an aromatic type (including heterocyclic rings), an alicyclic type (including heterocyclic rings) and an aliphatic type (non-cyclic). Among them, those having a ring structure is preferred from the viewpoint of maintaining well an aligning property of liquid crystal molecules.

Accordingly, when using an aliphatic (non-cyclic) type (preferably those having a short chain), this is preferably used in combination with an alicyclic type and/or an aromatic type, and a use amount thereof has to fall in a range where an adverse effect is not exerted on the aligning property.

In the electrical characteristics of liquid crystal displays, a large voltage holding ratio and small residual charge are particularly desired, and in order to satisfy such requirements, it is preferred to use alicyclic dicarboxylic acid or aromatic dicarboxylic acid or use them in combination.

$R^3$ which is a divalent organic residue has preferably, as is the case with $R^2$ described above, such a structure that an oxygen-containing group such as an ester group and an ether group and a sulfur-containing group which cause a reduction in the electrical properties of a liquid crystal display are not contained, but those containing an oxygen-containing group and a sulfur-containing group do not present a specific problem since the influence described above is small when a blending proportion of the N-substituted PA is small.

The dicarboxylic acid giving such $R^3$ includes, for example, aliphatic dicarboxylic acids such as malonic acid, dimethylmalonic acid, succinic acid, glutaric acid, adipic acid, 2-methyladipic acid, trimethyladipic acid, pimelic acid, 2,2-dimethyl-glutaric acid, 3,3-diethylsuccinic acid, azelaic acid, sebacic acid and suberic acid, alicyclic dicarboxylic acids such as 1,3-cyclopentanedicarboxylic acid, 1,4-cyclohexanedicarboxylic acid, 1,3-cyclohexanedicarboxylic acid and 1,2-cyclohexanedicarboxylic acid, aromatic dicarboxylic acids such as phthalic acid, isophthalic acid, terephthalic acid, 2,5-naphthalenedicarboxylic acid, 2,7-naphthalene-dicarboxylic acid, 1,4-naphthalenedicarboxylic acid, 1,4-phenylenedioxydiacetic acid, 1,3-phenylenedioxydiacetic acid, diphenic acid, dibenzoic acid, 4,4'-dioxydibenzoic acid, diphenylmethane-4,4'-dicarboxylic acid, diphenylsulfone-4,4'-dicarboxylic acid, 4,4'-diphenyldicarboxylic acid and 2,2-bis(4-carboxyphenyl)propane, and 5-hydroxyterephthalic acid. These dicarboxylic acids may have a form of acid dihalide.

The dicarboxylic acids described above and acid dihalides thereof (hereinafter referred to as dicarboxylic acids) are preferably dicarboxylic acids which can provide particularly polyamides having a linear structure from the viewpoint of suitably maintaining an aligning property of liquid crystal molecules.

Among them, preferably used are cyclohexyl-1,4-dicarboxylic acid, terephthalic acid, diphenyl-4,4'-dicarboxylic acid, 4,4'-dicarboxy-diphenylmethane, 4,4'-dicarboxy-diphenylethane, 4,4'-dicarboxy-diphenylpropane, 2,2-bis(4-carboxy)-diphenylmethane, 2,2-bis(4-carboxy)-diphenylethane, 2,2-bis(4-carboxy)-diphenylpropane, terphenyldicarboxylic acid and acid dihalides thereof.

$R^3$ is given by removing carboxyl groups or carbonyl halide groups (hereinafter, these groups are referred to as carboxyl groups in a general term) from the dicarboxylic acids. A part of the dicarboxylic acids giving such $R^3$ may be siloxanedicarboxylic acid represented by Formula (13) or acid dichloride thereof (hereinafter referred to as siloxanedicarboxylic acids).

When one or more of the above siloxanedicarboxylic acids are contained in a part of $R^3$, the resulting liquid crystal alignment film can be provided with an excellent adhesive property with a substrate:

wherein $R^{17}$ and $R^{18}$ represent methyl, ethyl, phenyl or cyclohexyl, and v, w and x are 1 to 5.

It has already been described that one of methods for enlarging a pretilt angle of liquid crystal molecules is to introduce a side chain component in $R^3$. Those represented by Formulae (14) and (15) can be given as examples of the dicarboxylic acid giving $R^3$ with a side chain component which makes it possible to enlarge the pretilt angle:

(14)

wherein $X^2$ represents a single bond, —O—, —COO—, —NH—, an alkylene group having 1 to 6 carbon atoms, —OCO—, —NHCO—, —CONH—, —S— or —CH$_2$—, and $R^{19}$ represents a hydrocarbon group having 1 to 6 carbon atoms or a perfluoroalkyl group:

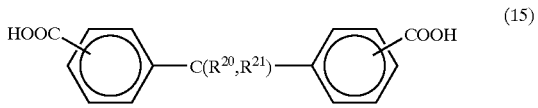

(15)

wherein $R^{20}$ and $R^{21}$ each represent independently an alkyl group having 1 to 12 carbon atoms, and the total of the carbon atoms thereof is 4 or more.

—$X^2R^{19}$ in Formula (14) corresponds to the side chain component which makes it possible to enlarge the pretilt angle, and ($R^2$, $R^{21}$) in Formula (15) corresponds thereto. As apparent from these examples, overall observation shows that the side chain component which makes it possible to enlarge the pretilt angle is a group having a long chain.

Next, the diamine giving $R^4$ which is a divalent organic residue is widely selected from publicly known diamines and is preferably a diamine compound provided with a side chain component which makes it possible to enlarge the pretilt angle (hereinafter, these diamines and diamine compound shall be referred to as diamines in a general term). Use of such diamine compound in combination with the diamines giving $R^2$ described above makes it possible to further elevate the electrical characteristics of the liquid crystal display and therefore is preferred.

The side chain component described above includes an aliphatic hydrocarbon group having 3 or more carbon atoms, a hydrocarbon group containing an alicyclic component which may have a substituent and a hydrocarbon group containing an aromatic component which may have a substituent. Among these hydrocarbon groups, the aliphatic hydrocarbon group may be those in which two or more methylene groups which are not adjacent to each other are substituted with an oxygen atom or an oxygen-containing group such as CO or COO and a sulfur atom and those in which a hydrogen atom is substituted with an alkoxy group or a halogen, but those having such a structure that oxygen and sulfur atoms are not contained are preferred from the viewpoint of the electrical characteristics of the element. However, when a small amount of the N-substituted polyamide using these diamines is used, an influence of oxygen and sulfur atoms is reduced, and therefore an adverse effect thereof is decreased.

Specific examples of the diamine compound described above which is provided with a side chain component include, for example, those represented by Formula (16) or (17):

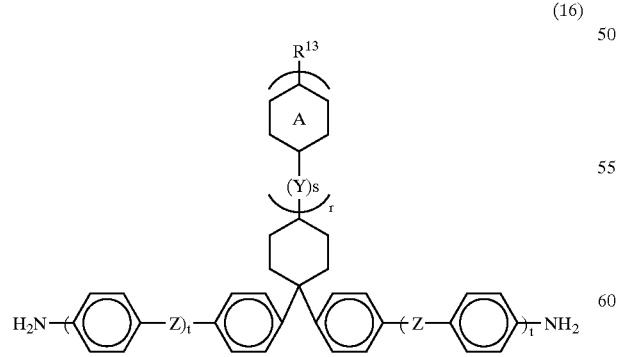

(16)

wherein $R^{13}$, Y, a ring A, Z, r, s and t are synonymous with those described above, and as described above, hydrogens on the optional benzene ring or cyclohexane ring may be substituted with a lower alkyl group:

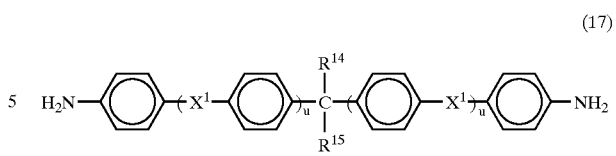

(17)

wherein $X^1$, $R^4$, $R^{15}$ and u are synonymous with those described above, and as described above, hydrogens on the optional benzene ring may be substituted with a lower alkyl group.

Specific examples of such diamine compound, which are represented by Formula (16), include the following ones.

When Z=oxygen, r=0 and t=1:

1,1-Bis[4-(4-aminophenoxy)phenyl]cyclohexane, 1,1-bis[4-(4aminophenoxy)phenyl]-4-methylcyclohexane, 1,1-bis[4-(4-aminophenoxy)phenyl]-4-ethylcyclohexane, 1,1-bis[4-(4-aminophenoxy)phenyl]-4-n-propyl-cyclohexane, 1,1-bis[4-(4-aminophenoxy)phenyl]-4-n-butylcyclohexane, 1,1-bis[4-(4-aminophenoxy)phenyl]-4-n-pentylcyclohexane, 1,1-bis[4-(4-aminophenoxy)-phenyl]-4-n-hexylcyclohexane, 1,1-bis[4-(4-aminophenoxy)phenyl]-4-n-heptylcyclohexane, 1,1-bis[4-(4-aminophenoxy)phenyl]-4-n-octylcyclohexane, 1,1-bis[4-(4-aminophenoxy)phenyl]-4-n-nonylcyclohexane, 1,1-bis[4-(4-aminophenoxy)phenyl]-4-n-decylcyclohexane, 1,1-bis[4-(4-aminophenoxy)phenyl]-4-n-undecyl-cyclohexane, 1,1-bis[4-(4-aminophenoxy)phenyl]-4-n-dodecylcyclohexane, 1,1-bis[4-(4-aminophenoxy)-phenyl]-4-n-tridecylcyclohexane, 1,1-bis[4-(4-aminophenoxy)phenyl]-4-n-tetradecylcyclohexane and 1,1-bis[4-(4-aminophenoxy)phenyl]-4-n-pentadecylcyclohexane.

When r and t=0:

1,1-Bis(4-aminophenyl) cyclohexane, 1,1-bis(4-aminophenyl)-4-methylcyclohexane, 1,1-bis(4-aminophenyl)-4-ethylcyclohexane, 1,1-bis(4-ainophenyl)-4-n-propyl-cyclohexane, 1,1-bis(4-aminophenyl)-4-n-butylcyclohexane, 1,1-bis(4-aminophenyl)-4-n-pentylcyclohexane, 1,1-bis(4-aminophenyl)-4-n-hexylcyclohexane, 1,1-bis(4-aminophenyl)-4-n-heptylcyclohexane, 1,1-bis(4-aminophenyl)-4-n-octylcyclohexane, 1,1-bis(4-aminophenyl)-4-n-nonylcyclohexane, 1,1-bis(4-aminophenyl)-4-n-decylcyclohexane, 1,1-bis(4-aminophenyl)-4-n-undecyl-cyclohexane, 1,1-bis(4-aminophenyl)-4-n-dodecylcyclohexane, 1,1-bis(4-aminophenyl)-4-tridecylcyclohexane, 1,1-bis(4-aminophenyl)-4-n-etradecylcyclohexane and 1,1-bis(4-aminophenyl)-4-n-entadecylcyclohexane.

When A=cyclohexyl, r=1, and s and t=0:

1,1-Bis(4-aminophenyl)-4-cyclohexylcyclohexane, 1,1-bis(4-minophenyl)-4-(4-methyl-trans-cyclohexyl)-cyclohexane, 1,1-bis(4-aminophenyl)-4-(4-ethyl-trans-cyclohexyl)cyclohexane, 1,1-bis(4-aminophenyl)-4-(4-n-propyl-trans-cyclohexyl)cyclohexane, 1,1-bis(4-aminophenyl)-4-(4-n-butyl-trans-cyclohexyl)-cyclohexane, 1,1-bis(4-aminophenyl)-4-(4-n-pentyl-trans-cyclohexyl)cyclohexane, 1,1-bis(4-aminophenyl)-4-(4-n-hexyl-trans-cyclohexyl)cyclohexane, 1,1-bis(4-aminophenyl)-4-(4-n-heptyl-trans-cyclohexyl)-cyclohexane, 1,1-bis(4-aminophenyl)-4-(4-n-ocyl-trans-cyclohexyl)cyclohexane, 1,1-bis(4-aminophenyl)-4-(4-n-nonyl-trans-cyclohexyl)cyclohexane, 1,1-bis(4- aminophenyl)-4-(4-n-decyl-trans-cyclohexyl)-cyclohexane, 1,1-bis(4-aminophenyl)-4-(4-n-undecyl-trans-cyclohexyl)cyclohexane, 1,1-bis(4-aminophenyl)-4-(4-n-dodecyl-trans-cyclohexyl)cyclohexane, 1,1-bis(4-aminophenyl)-4-(4-n-tridecyl-trans-cyclohexyl)-cyclohexane, 1,1-bis(4-aminophenyl)-4-(4-n-tetradecyl-trans-cyclohexyl)cyclohexane and 1,1-bis(4-aminophenyl)-4-(4-n-pentadecyl-trans-cyclohexyl)cyclohexane.

When A=cyclohexyl, Z=oxygen, r=1, s=0 and t=1:
  1,1-Bis[4-(4-aminophenoxy)phenyl]-4-(cyclohexyl)cyclohexane, 1,1-bis[4-(4-aminophenoxy)-phenyl]-4-(4-methylcyclohexyl)cyclohexane, 1,1-bis[4-(4-minophenoxy)phenyl]-4-(4-ethylcyclohexyl)-cyclohexane, 1,1-bis[4-(4-aminophenoxy)phenyl]-4-(4-propylcyclohexyl)cyclohexane, 1,1-bis[4-(4-amino-phenoxy)phenyl]-4-(4-butyl-cyclohexyl)cyclohexane, 1,1-bis[4-(4-aminophenoxy)phenyl]-4-(4-pentyl-cyclohexyl)cyclohexane, 1,1-bis[4-(4-aminophenoxy)-phenyl]-4-(4-hexyl-cyclohexyl)cyclohexane, 1,1-bis[4-(4-aminophenoxy)phenyl]-4-(4-heptylcyclohexyl)-cyclohexane and 1,1-bis[4-(4-aminophenoxy)phenyl]-4-(4-octylcyclohexyl)cyclohexane.

When A=cyclohexyl, Y=CH$_2$, r and s=1, and t=0:
  1,1-Bis(4-aminophenyl)-4-(cyclohexylmethyl)-cyclohexane, 1,1-bis(4-aminophenyl)-4-[(4-methyl-cyclohexyl)methyl]cyclohexane, 1,1-bis(4-amino-phenyl)-4-[(4-ethylcyclohexyl)methyl]cyclohexane, 1,1-bis(4-aminophenyl)-4-[(4-propylcyclohexyl)methyl]cyclohexane, 1,1-bis(4-aminophenyl)-4-[(4-butylcyclohexyl)methyl]cyclohexane, 1,1-bis(4-aminophenyl)-[4-(4-pentylcyclohexyl)methyl]-cyclohexane, 1,1-bis(4-aminophenyl)-4-[(4-hexylcyclohexyl)methyl]cyclohexane, 1,1-bis(4-aminophenyl)-4-[(4-heptylcyclohexyl)methyl]-cyclohexane and 1,1-bis(4-aminophenyl)-4-[(4-octylcyclohexyl)methyl]cyclohexane.

When A=phenyl, Y=CH$_2$, Z=oxygen, and r, s and t=1:
  1,1-Bis[4-(4-aminophenoxy)phenyl]-4-(phenylmethyl)cyclohexane, 1,1-bis[4-(4-aminophenoxy)phenyl]-4-[(4-methylphenyl)methyl]-cyclohexane, 1,1-bis[4-(4-aminophenoxy)phenyl]-4-[(4-ethylphenyl)methyl]cyclohexane, 1,1-bis[4-(4-aminophenoxy)phenyl]-4-[(4-propylphenyl)methyl]-cyclohexane, 1,1-bis[4-(4-aminophenoxy)phenyl]-4-[(4-butylphenyl)methyl]cyclohexane, 1,1-bis[4-(4-amino-phenoxy)phenyl]-4-[(4-pentylphenyl)methyl]cyclohexane, 1,1-bis[4-(4-aminophenoxy)phenyl]-4-[(4-hexylphenyl)-methyl]cyclohexane, 1,1-bis[4-(4-aminophenoxy)-phenyl]-4-[(4-heptylphenyl)methyl]cyclohexane and 1,1-bis[4-(4-aminophenoxy)phenyl]-4-[(4-octylphenyl)-methyl]cyclohexane.

When A=phenyl, Y=CH$_2$, r and s=1, and t=0:
  1,1-Bis(4-aminophenyl)-4-(phenylmethyl)-cyclohexane, 1,1-bis(4-aminophenyl)-4-[(4-methylphenyl)methyl]cyclohexane, 1,1-bis(4-aminophenyl)-4-[(4-ethylphenyl)methyl]cyclohexane, 1,1-bis(4-aminophenyl)-4-[(4-propylphenyl)methyl]cyclohexane, 1,1-bis(4-aminophenyl)-4-[(4-butyl-phenyl)methyl]cyclohexane, 1,1-bis(4-aminophenyl)-4-[(4-pentylphenyl)methyl]cyclohexane, 1,1-bis(4-aminophenyl)-4-[(4-hexylphenyl)methyl]cyclohexane, 1,1-bis(4-aminophenyl)-4-[(4-heptylphenyl)methyl]-cyclohexane and 1,1-bis(4-aminophenyl)-4-[(4-octylphenyl)methyl]cyclohexane.

When A=phenyl, Y=CH$_2$, Z=CH$_2$, and r, s and t=1:
  1,1-Bis{4-[(4-aminophenyl)methyl]phenyl}-4-(phenylmethyl)cyclohexane, 1,1-bis{4-[(4-amino-phenyl)methyl]phenyl}-4-[(4-methylphenyl)methyl]-cyclohexane, 1,1-bis{4-[(4-aminophenyl)methyl]-phenyl}-4-[(4-ethylphenyl)methyl]cyclohexane, 1,1-bis {4-[(4-aminophenyl)methyl]phenyl}-4-[(4-propyl-phenyl)methyl]cyclohexane, 1,1-bis{4-[(4-amino-phenyl)methyl]phenyl}-4-[(4-butylphenyl)methyl]-cyclohexane, 1,1-bis{4-[(4-aminophenyl)methyl]-phenyl}-4-[(4-pentylphenyl)methyl]cyclohexane, 1,1-bis{4-[(4-aminophenyl)methyl]phenyl}-4-[(4-hexyl-phenyl)methyl]cyclohexane, 1,1-bis{4-[(4-amino-phenyl)methyl]phenyl}-4-[(4-heptylphenyl)methyl]-cyclohexane and 1,1-bis{4-[(4-aminophenyl)methyl]-phenyl}-4-[(4-octylphenyl)methyl]cyclohexane.

When Z=CH$_2$, r=0, and t=1:
  1,1-Bis{4-[(4-aminophenyl)methyl]phenyl}-cyclohexane, 1,1-bis{4-[(4-aminophenyl)methyl]-phenyl}-4-methylcyclohexane, 1,1-bis{4-[(4-amino-phenyl)methyl]phenyl}-4-ethylcyclohexane, 1,1-bis{4-[(4-aminophenyl)methyl]phenyl}-4-propylcyclohexane, 1,1-bis{4-[(4-aminophenyl)methyl]phenyl}-4-butyl-cyclohexane, 1,1-bis{4-[(4-aminophenyl)methyl]phenyl}-4-pentylcyclohexane, 1,1-bis{4-[(4-amino-phenyl)methyl]phenyl}-4-hexylcyclohexane, 1,1-bis{4-[b(4-aminophenyl)methyl]phenyl}-4-4-heptylcyclohexane 1,1-bis{4-[(4-aminphenyl)methyl]phenyl}-4-octylcyclohexane.

When A=cyclohexyl, Y=CH$_2$, Z=CH$_2$, r and t=1, and s=2:
  1,1-Bis{4-[((4-aminophenyl)methyl]phenyl}-4-[2-(cyclohexyl)ethyl]cyclohexane, 1,1-bis{4-[(4-amino-phenyl)methyl]phenyl}-4-[2-(4-methyl-trans-cyclohexyl)ethyl]cyclohexane, 1-bis{4-[(4-amino-phenyl)methyl]phenyl}-4-[2-(4-ethyl-trans-cyclohexyl)ethyl]cyclohexane, 1,1-bis{4-[(4-aminophenyl)methyl]phenyl}-4-[2-(4-propyl-trans-cyclohexyl)ethyl]cyclohexane, 1,1-bis{4-[(4-aminophenyl)methyl]phenyl}-4-[2-(4-butyl-trans-cyclohexyl)ethyl]cyclohexane, 1,1-bis{4-[(4-aminophenyl)methyl]phenyl}-4-[2-(4-pentyl-trans-cyclohexyl)ethyl]cyclohexane, 1,1-bis{4-[(4-aminophenyl)methyl]phenyl}-4-[2-(4-amyl-trans-cyclohexyl)ethyl]cyclohexane, 1,1-bis{4-[(4-aminophenyl)methyl]phenyl}-4-[2-(4-hexyl-trans-cyclohexyl)ethyl]cyclohexane, 1,1-bis{4-[(4-aminophenyl)methyl]phenyl}-4-[2-(4-heptyl-trans-cyclohexyl)ethyl]cyclohexane, 1,1-bis{4-[(4-aminophenyl)methyl]phenyl}-4-[2-(4-octyl-trans-cyclohexyl)ethyl]cyclohexane, 1,1-bis{4-[(4-aminophenyl)methyl]phenyl}-4-[2-(4-nonyl-trans-cyclohexyl)ethyl]cyclohexane and 1,1-bis{4-[(4-aminophenyl)methyl]phenyl}-4-[2-(4-dodecyl-trans-cyclohexyl)ethyl]cyclohexane.

In these diamine compounds, when r is 0 and $R^{13}$ is hydrogen or an alkyl group having a short chain, the pretilt angle becomes small, and when r is 1 to 5 (the rings on the side chain are 2 to 6), the pretilt angle becomes large even if $R^{13}$ is hydrogen.

When the pretilt angle is small, the composition is suited to an IPS element, and when the pretilt angle is 3 to 8°, it is suited to a TN type TFT element.

Next, the following ones can be given as the diamine compound represented by Formula (17).

When $X^1$=0 (oxygen), and u=1:
  2,2-Bis[4-(4-aminophenoxy)phenyl]pentane, 2,2-bis[4-(4-aminophenoxy)phenyl]hexane, 2,2-bis[4-(4-aminophenoxy)phenyl]heptane, 2,2-bis[4-(4-amino-phenoxy)phenyl]octane, 2,2-bis[4-(4-aminophenoxy)-phenyl]nonane, 2,2-bis[4-(4-aminophenoxy)phenyl]- decane, 2,2-bis[4-(4-aminophenoxy)phenyl]undecane, 2,2-bis[4-(4-aminophenoxy)phenyl]dodecane, 2,2-bis [4-(4-aminophenoxy)phenyl]tridecane, 2,2-bis[4-(4-aminophenoxy)phenyl]tetradecane, 2,2-bis[4-(4-aminophenoxy)phenyl]pentadecane, 2,2-bis[4-(4-aminophenoxy)phenyl]hexadecane, 2,2-bis[4-(4-aminophenoxy)phenyl]heptadecane, 2,2-bis[4-(4-aminophenoxy)phenyl]octadecane and 2,2-bis[4-(4-aminophenoxy)phenyl]nonadecane.

When $X^1=CH_2$, and u=1:

2,2-Bis{4-[(4-aminophenyl)methyl]phenyl}pentane, 2,2-bis{4-[(4-aminophenyl)methyl]phenyl}hexane, 2,2-bis{4-[(4-aminophenyl)methyl]phenyl}heptane, 2,2-bis{4-[(4-aminophenyl)methyl]phenyl}octane, 2,2-bis{4-[(4-aminophenyl)methyl]phenyl}nonane, 2,2-bis{4-[(4-aminophenyl)methyl]phenyl}decane, 2,2-bis{4-[(4-aminophenyl)methyl]phenyl}undecane, 2,2-bis{4-[(4-aminophenyl)methyl]phenyl}dodecane, 2,2-bis{4-[(4-aminophenyl)methyl]phenyl}tridecane, 2,2-bis{4-[(4-aminophenyl)methyl]phenyl}tetradecane, 2,2-bis{4-[(4-aminophenyl)methyl]phenyl}pentadecane, 2,2-bis{4-[(4-aminophenyl)methyl]phenyl}hexadecane, 2,2-bis{4-[(4-aminophenyl)methyl]phenyl}heptadecane, 2,2-bis{4-[(4-aminophenyl)methyl]phenyl}octadecane and 2,2-bis{4-[(4-aminophenyl)methyl]phenyl}nonadecane, 2,2bis{4-[(4-aminophenyl)methyl]phenyl}perfluoropentane, 2,2-bis{4-[(4-aminophenyl)methyl]phenyl}-perfluorohexane, 2,2-bis{4-[(4-aminophenyl)methyl)-phenyl}perfluoroheptane, 2,2-bis{4-[(4-aminophenyl)-methyl]phenyl}perfluorooctane, 2,2-bis{4-[(4-aminophenyl)methyl]phenyl}perfluorononane, 2,2-bis{4-[(4-aminophenyl)methyl]phenyl}perfluorodecane, 2,2-bis{4-[(4-aminophenyl)methyl]phenyl}perfluoroundecane, 2,2-bis{4-[(4-aminophenyl)methyl] phenyl}perfluorododecane, 2,2-bis{4-[(4-aminophenyl)methyl]phenyl}perfluoro-tridecane, 2,2-bis{4-[(4-aminophenyl)methyl]phenyl}perfluoro-tetradecane, 2,2-bis{4-[(4-aminophenyl)-methyl] phenyl}perfluoropentadecane, 2,2-bis{4-[(4-aminophenyl)methyl]phenyl}perfluorohexadecane, 2,2-bis{4-[(4-aminophenyl)methyl]phenyl}perfluoroheptadecane, 2,2-bis{4-[(4-aminophenyl)methyl]-phenyl}perfluorooctadecane and 2,2-bis{4-[(4-aminophenyl)methyl]phenyl}perfluoro nonadecane.

Examples of the 2,2-bis base compounds have been shown above, but it is a matter of course that 1,1-bis base, 3,3-bis base, 4,4-bis base or 5,5-bis base compounds can similarly be shown depending on the carbon number of $R^{14}$ and $R^{15}$.

Examples of the diamine compounds represented by Formula (16) or (17) have merely been shown above, but it is a matter of course that the diamine compound according to the present invention shall not be restricted to them and that other various embodiments can be present as long as the object of the present invention is achieved.

For example, a diamine compound represented by Formula (18) can be shown as a compound having such a form that phenylenediamine is provided with a side chain:

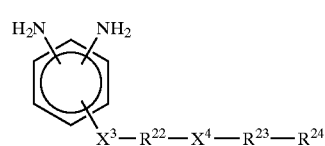

(18)

wherein $X^3$ and $X^4$ each represent independently a single bond, —O—, —COO—, —NH—, —CONH— or —(CH$_2$)$_n$—; $R^{22}$ and $R^{23}$ each represent independently a single bond or a divalent group having 1 to 3 aromatic rings and/or alicyclic rings; $R^{24}$ represents hydrogen, F, a hydrocarbon group, a fluorinated hydrocarbon group, an alkoxy group, a cyano group or an OH group; and n is an integer of 1 to 5.

Specific examples of the diamine compounds described above include 4-[3-(4-biphenyloxy)propoxy]-1,3-diamine, 4-[8-(4-biphenyloxy)octyloxy]-1,3-diamino-benzene, 4-[3-(4-cyanobiphenyl-4'-oxy)propoxy]-1,3-diaminobenzene, 4-[12-(4-cyanobiphenyl-4'-oxy)-dodecyloxy]-1,3-diaminobenzene, 4-[6-(4-methoxy-biphenyl-4'-oxy)hexyloxy]-1,3-diaminobenzene, 4-[3-(4-fluorobiphenyl-4'-oxy)propoxy]-1,3-diaminobenzene, dodecyl 2,4-diaminobenzoate, octyl 2,4-diamino-benzoate and 1,5-diamino-2-octyloxycarbonylamino-benzene.

In addition to the above, capable of being given are 1,4-diamino-3-[4-(4-alkylcyclohexyl)-cyclohexyloxy] benzene, 1,4-diamino-3-[4-(4-alkylphenyl)cyclohexyloxy] benzene, 1,4-diamino-3-((4-alkylterphenyl)oxy)benzene, 1,4-diamino-(2-alkyl)benzene, 1,4-diamino-(2,5-dialkyl) benzene and 2-alkyloxy-1,4-diaminobenzene, and diamine compounds obtained by providing phenylenediamine with a steroid base side chain.

These diamines (hereinafter referred to as first diamine compounds) which can enlarge a pretilt angle of liquid crystal molecules may be used with diamines giving low pretilt angles (hereinafter referred to as second diamine compounds). The second diamine compounds include those such as presented by Formula (12), and the following aromatic, alicyclic and aliphatic diamine compounds.

Aromatic Diamine Compounds:

2,2-Bis(4-aminophenyl)propane, 2,6-diaminopyridine, bis(4-aminophenyl)diethylsilane, bis-(4-aminophenyl) diphenylsilane, bis-(4-amino-phenyl) ethylphosphine oxide, bis-(4-aminophenyl)-N-butylamine, N,N-bis-(4-aminophenyl)-N-methylamine, N-(3-aminophenyl)-4-aminobenzamide, 3,3'-diamino-diphenylmethane, 3,3'-diaminodiphenyl ether, 3,3'-diaminodiphenylsulfone, 3,3'-diaminodiphenylpropane, 3,3'-diamino-diphenylsulfide, 2,3,5,6-tetramethyl-p-phenylenediamine, 2,5-dimethyl-p-phenylenediamine, p-phenylenediamine, m-phenylenediamine, p-xylenediamine, m-xylenediamine, p-xylylenediamine, m-xylylenediamine, 2,4-diaminotoluene, 2,6-diaminotoluene, 3,3'-diamino-diphenylethane, 3,3'-diaminodiphenylpropane, 4,4'-diaminodiphenylhexafluoropropane, 3,3'-diamino-diphenylhexafluoropropane, 3,3'-diaminodiphenyl-benzophenone, 4,4'-diaminodiphenylsulfide, 4,4'-diaminodiphenylsulfone, 4,4'-diaminodiphenyl ether, 3,4'-diaminodiphenyl ether, 1,5-diaminonaphthalene, 2,6-diaminonaphthalene, 2,2-bis(4-aminophenyl) propane, 2,2-bis(4-aminophenyl)hexafluoropropane, bis[4-(4-aminophenoxy)phenyl]methane, 2,2-bis[4-(4-amino-phenoxy)phenyl]ethane, 1,1-(or 1,2-)bis[4-(4-aminophenoxy)phenyl]propane, 2,2-bis[4-(4-aminophenoxy)phenyl]butane, 4,4'-bis(4-aminophenoxy)- diphenyl ketone, bis(4-(4-aminophenoxy)phenyl] sulfone, bis[4-(4-aminophenoxy)phenyl]sulfide, 1,3-(or 1,4-)bis[4-(4-aminophenoxy)phenyl]benzene, 4,4-bis[4-(4-aminophenoxy)phenyl]biphenyl, 1,2-(or 1,3- or 1,4-)bis[4-(4-aminophenoxy)phenyl]cyclohexane, bis[4-(4-aminophenoxy)phenyl]hexafluoropropane, 2,2-bis[4-(2-aminophenoxy)phenylhexafluoropropane, 2,2-bis[4-(3-aminophenoxy)phenyl]hexafluoropropane, 2,2-bis[4-(3-carbamoyl-4-aminophenoxy) phenyl]hexafluoropropane, 2,2-bis-(3-sulfamoyl-4-aminophenoxy) hexafluoropropane, 2,2-bis-(3-carboxy-4-aminophenyl)hexafluoropropane, 2,2-bis[4-(3-sulfamoyl-4-aminophenoxy)phenyl-hexafluoropropane, 2,2-bis[4-(3-carboxy-4-amino-phenoxy)phenyl]hexafluoropropane, 1,3-bis[2-{4-(4-aminophenoxy)phenyl}hexafluoroisopropyl]benzene, 2,4-bis(β-amino-t-butyl)toluene, bis(p-β-methyl-γ-aminopentyl)benzene, bis-p-(1,1-dimethyl-5-amino-pentyl)benzene, bis(p-β-amino-t-butylphenyl) ether, bis(4-aminobenzyloxy)methane, bis(4-aminobenzyloxy)-ethane, bis(4-aminobenzyloxy) propane and bis(4-aminobenzyloxy)cyclohexane.

Alicyclic Diamine Compounds:

1,4-Diaminodicyclohexane, 1,3-bis(aminomethyl)-cyclohexane, 1,4-bis(aminomethyl)cyclohexane, 4,4'-diaminodicyclohexylmethane, bis(2-methyl-4-aminocyclohexyl)methane, isophoronediamine, 2,5-bis-(aminomethyl)-bicycloheptane, 2,6-bis(aminomethyl)-bicycloheptane, 2,3-diaminobicyclo[2,2,1]heptane, 2,5-diaminobicyclo[2,2,1]heptane, 2,6-diaminobicyclo-(2,2,1]heptane, 2,7-diaminobicyclo[2,2,1]heptane, 2,3-diamino-7-azabicyclo[2,2,1]heptane, 2,5-diamino-7-azabicyclo[2,2,1]heptane, 2,6-diamino-7-azabicyclo-[2,2,1]heptane, 2,3-diamino-7-thiabicyclo[2,2,1]-heptane, 2,5-diamino-7-thiabicyclo[2,2,1]heptane, 2,6-diamino-7-thiabicyclo[2,2,1] heptane, 2,3-diaminobicyclo[2,2,2]octane, 2,5-diaminobicyclo-[2,2,2]octane, 2,6-diaminobicyclo[2,2,2]octane, 2,5-diaminobicyclo[2,2,2]octane-7-ene, 2,5-diamino-7-azabicyclo[2,2,2]octane, 2,5-diamino-7-oxabicyclo-[2,2,2]octane, 2,5-diamino-7-thiabicyclo[2,2,2]octane, 2,6-diaminobicyclo[3,2,1]octane, 2,6-diaminoaza-bicyclo[3,2,1]octane, 2,6-diaminooxabicyclo[3,2,1]-octane, 2,6-diaminothiabicyclo[3,2,1]octane, 2,6-diaminobicyclo [3,2,2]nonane, 2,6-diaminobicyclo-[3,2,2]nonane-8-ene, 2,6-diamino-8-azabicyclo[3,2,2]-nonane, 2,6-diamino-8-oxabicyclo[3,2,2]nonane and 2,6-diamino-8-thiabicyclo[3,2,2]nonane.

Aliphatic Diamines:

Aliphatic diamines such as ethylenediamine, trimethylenediamine, tetramethylenediamine, pentamethylenediamine and hexamethylenediamine, and diamines such as alkylenediamine having an oxygen atom in an alkylene group.

Among these second diamine compounds, the aliphatic diamines, if used in combination in a large amount, may exert an adverse effect on an aligning property of liquid crystal molecules, and therefore a use amount thereof has to be restricted in a range where such adverse effect can be avoided. Further, in order to prevent the electrical properties of a liquid crystal display from being reduced, these aliphatic diamines have preferably such structure that they do not have an oxygen-containing group such as an ester group and an ether group and a sulfur-containing group because of the reason described above.

Such diaminosilicon compounds used for Formula (1) can further be given as the second diamine compounds.

In the diamines giving $R^4$, a proportion of the first diamine compound to the second diamine compound is varied depending on the kind of the former and the pretilt angle required and is suitably 100/0 to 10/90 in terms of the first diamine compound/the second diamine compound (mole %).

Next, at least one of $R^5$ and $R^6$ has to be a monovalent organic group which is substituted on an N part and may be branched, and the other has to be hydrogen or a monovalent organic group. Both are preferably groups selected from monovalent organic groups.

More specific examples of such monovalent organic group include an alkyl group, an alkoxy group or a perfluoroalkyl group each of which may have an ether group in the group and has 1 to 22 carbon atoms, a phenyl group, a benzyl group or a cydlohexyl group each of which may have a substituent, or an organic group having a steroid group.

These organic groups mean side chains substituted on an N part thereof (N part-substituted side chain) in the polyamide represented by Formula (2).

From the viewpoint of a stability of the pretilt angle, providing a side chain component group in $R^4$ is more preferred than substituting a side chain on the N part. Accordingly, the side chain substituted on the N part does not necessarily have to have a long chain, and the side chain having a long chain tends to rather deteriorate a liquid crystal resistance of the resulting liquid crystal alignment film and therefore is not preferred.

When the diamines described above are the diamine compounds represented by Formula (16) or (17) described above, short chain substituents as methyl, ethyl, phenyl, benzyl, cyclohexyl, cyclohexylmethyl and acetyl are preferably used for $R^5$ or $R^6$.

The N-substituted PA represented by Formula (2) according to the present invention can be obtained, as already described, by either of two methods shown below. One of them is a method in which a diamine compound (hereinafter referred to as a substituted diamine compound) obtained by substituting H on an N part in advance with $R^5$ and/or $R^6$ being an organic group is reacted with the dicarboxylic acids giving $R^3$ (hereinafter referred to as a presubstitution method), and the other is a method which is more preferred and in which diamine is reacted with the dicarboxylic acids giving $R^3$ and then H on an N part of the polyamide thus obtained is substituted with $R^5$ and/or $R^6$ being the organic group (hereinafter referred to as an after-substitution method).

A substitution rate of the organic group in the N-substituted PA is suitably 50% or more, preferably 70% or more and more preferably 90% or more. The above substitution rate of less than 50% is less effective in terms of the electrical characteristics of the liquid crystal display.

The substituted diamine compound related to the presubstitution method is readily obtained by referring to publicly known organic synthetic methods, for example, a method in which diamine is dehydrated and condensed with aldehydes such as propylaldehyde and benzaldehyde or ketones such as methyl ethyl ketone and cyclohexanone to obtain imine and a double bond of the imine is reduced, a method in which diamine is reacted with halides such as acetyl chloride and benzoyl chloride to obtain amide and a carbonyl group of the amide is reduced with lithium aluminum hydride and a method in which N-substituted anilines such as N-methylaniline, N,N-diphenylamine and N-methyl-3-aminotoluene are reacted with formaldehyde in the presence of a catalyst to obtain N,N'-substituted diaminodiphenyl-methanes.

The after-substitution method is carried out by reacting polyamide dissolved in a solvent such as dimethylsulfoxide, N-methylpyrrolidone, N,N-dimethylformamide and N,N-dimethylacetamide with a halide such as $R^5$—Br, $R^5$—I, $R^6$—Br and $R^6$—I in the presence of sodium hydride, potassium hydride and a base such as sodium hydroxide, potassium hydroxide and triethylamine. When the above reactivity is low, it is preferred to pull out H on the amide-bonding part in advance by reacting with sodium hydride or butyl lithium and then react it with the halide described above.

In producing the N-substituted PA, the substituted diamine compound (a case of the presubstitution method) or the diamine compound (a case of the after-substitution method) has to be reacted in the above manner with the dicarboxylic acids in either case. This reaction can be carried out by reacting the respective components at a temperature falling in a range of 20 to 300° C., if necessary, in the presence of a condensing agent such as $(PhO)_3P$, $(PhO)PCl_2$, $PhPOCl_2$ and $(C_3H_7)_3P(O)$, pyridine and, if necessary, a solvent such as dimethylsulfoxide, N-methylpyrrolidone, N,N-dimethylformamide and N,N-dimethylacetamide.

When this reactivity is low, dicarboxylic halide may be substituted for the dicarboxylic acid, and N,N'-diacetyldiamine or N,N'-bis(trimethylsilyl)diamine may be substituted for the diamines.

The N-substituted PA (a case of the presubstitution method) or polyamide (a case of the after-substitution method) which is an intermediate product is obtained according to the reaction described above. These polymers contain unreacted raw materials, the condensing agent and the like, and therefore it is preferred that to throw them little by little into water, alcohols such as methanol, ethanol and isopropanol or hydrocarbons such as hexane and heptane to deposit the polymers and then filter, wash and dry the deposited polymers or to repeat, if necessary, these operations of deposition-filtering-washing-drying to thereby obtain the refined polymers.

One of the present inventions is a varnish composition comprising a polymer component comprising the polyamic acid represented by Formula (1) and the N-substituted PA represented by Formula (2) and a solvent for dissolving these polymer components.

In these polymer components, a mixed proportion of the N-substituted PA to the TV polyamic acid is 60/40-to 1/99 (% by weight). In other words, a proportion of the N-substituted PA is suitably 1 to 60% by weight, preferably 3 to 40% by weight and more preferably 5 to 30% by weight.

If the N-substituted PA exceeds 60% by weight, the resulting liquid crystal alignment film may have problems on an aligning property, a printing property (particularly easiness in cissing) or electrical characteristics, and therefore it is not preferred. On the other hand, if it is less than 1%, an effect of the electrical characteristics is small, and therefore it is not preferred either.

Even if the proportion falls in the suitable range described above, it is suitably 3% or more, preferably 5% or more from the viewpoint that a pretilt angle of a liquid crystal molecule in the resulting liquid crystal alignment film is maintained in a suitable value of 1° or more and that a process dependency of the pretilt angle is controlled, and it is suitably 40% or less, preferably 30% or less from the viewpoint of the electrical characteristics.

In another embodiment of the present invention, a part of the N-substituted PA which is one of the polymer components described above can be substituted with a soluble polyimide (hereinafter referred to as a side chain group-containing PI) represented by Formula (3).

The side chain group-containing PI mentioned above is a soluble polyimide having $R^7$ and $R^8$ at least one of which is provided with a side chain as referred in Formula (3), wherein above $R^7$ is a tetravalent organic residue originating in tetracarboxylic acid or tetracarboxylic dianhydride (hereinafter, these compounds are referred to as tetracarboxylic acids in a general term) which is given by removing a carboxyl group or a corresponding acid anhydride group (hereinafter, these groups are referred to as carboxyl groups in a general term), and $R^8$ is a divalent organic residue originating in diamines which is given by removing amino groups.

An imide conversion rate in such a side chain group-containing PI is suitably 50% or more, preferably 70% or more.

The tetracarboxylic acids giving such $R^7$ have to contain at least tetracarboxylic dianhydride which is usually known as forming an aliphatic or alicyclic soluble polyimide, and specific examples thereof include aliphatic butanetetracarboxylic dianhydride, alicyclic tricarboxycyclopentylacetic dianhydride, 3,4-dicarboxy-1,2,3,4-tetrahydronaphthalene-succinic dianhydride, 5-(2,5-dioxotetrahydro-3-furanyl)-3-cyclohexenedicarboxylic anhydride, 5-(2,5-dioxotetrahydrofuryl)-3-methyl-cyclohexene-dicarboxylic anhydride and 5-(2,5-dioxotetrahydro-furyl)-3-methyl-3-cyclohexenedicarboxylic anhydride.

If these tetracarboxylic acids exert an adverse effect on an aligning property of a liquid crystal molecule by using them alone, they are used preferably in combination with alicyclic or aromatic tetracarboxylic acids containing no aliphatic chains in a range where the polyimide maintains solubility.

Alicyclic ones, for example, cyclobutane, cyclopentane or cyclohexane base tetracarboxylic dianhydride, bicyclo[2. 2. 2]-oct-7-ene-2,3,5,6-tetracarboxylic dianhydride and 2,3,4,5-tetrtahydrofurantetracarboxylic dianhydride are more advantageous as the tetracarboxylic acids containing no aliphatic chains than aromatic ones, for example, pyromellitic dianhydride or biphenyl base, terphenyl base or naphthalene base tetracarboxylic dianhydride from the viewpoint of the electrical characteristics, but the aromatic base may be used in combination.

On the other hand, the diamine giving $R^8$ may be the same diamines as those giving $R^4$ represented by Formula (2) described above, and the side chain group-containing soluble PI represented by Formula (3) can similarly be obtained by reacting such diamines with the preceding tetracarboxylic acids giving $R^7$ according to a conventional method.

This side chain group-containing PI can be substituted for a part of the N-substituted PA represented by Formula (2), and therefore when the side chain group-containing PI is used in combination with the N-substituted PA, the total amount thereof may be understood by substituting with the use amount described above in the case of the N-substituted PA alone.

That is, a blending proportion of the total of the side chain group-containing PI and the N-substituted PA in the polymer component is suitably 1 to 60% by weight as is the case with the N-substituted PA alone, and the suitable range and the reasons therefor are the same.

The varnish composition of the present invention comprises such polymer component and a solvent for dissolving it, and in this case, a concentration (content) of the polymer component is suitably 0.1 to 40% by weight. That is, when applying the varnish composition on a substrate, required in a certain case is an operation in which the polymer component contained in the composition is diluted in advance with a solvent in order to control the film thickness. If the concentration of the polymer component exceeds 40% by weight, a viscosity of the composition becomes too high, and even if the solvent is added, it is poorly mixed with the composition, so that a defect of obtaining no desired dilution is brought about. Accordingly, it is not preferred. The matter described above applies particularly to a spinner method and a printing method, and in these methods, the concentration is controlled preferably to 10% by weight or less in order to maintain the film thickness well. In the other methods, for example, a dipping method, the concentration has to be further lowered than 10% by weight.

On the other hand, the polymer component having a concentration of less than 0.1% by weight is liable to bring about the problem that the resulting liquid crystal alignment film becomes too thin.

Accordingly, the concentration of the polymer component is suitably 0.1% by weight or more, preferably 0.5 to 10% by weight in a conventional spinner method and printing method.

Any one can be applied as the solvent used together with the polymer component described above in the varnish composition of the present invention without specific restrictions as long as they have a capability to dissolve the polymer component.

Such solvent includes widely known solvents which are usually used in a production process of polyamic acid and soluble polyimide and use fields thereof.

Capable of being given as examples thereof are aprotic polar organic solvents which are compatible with polyamide acid, such as N-methyl-2-pyrrolidone, dimethylimidazolidinone, N-methylcaprolactam, N-methylpropionamide, N,N-dimethylacetamide, dimethylsulfoxide, N,N-dimethylformamide, N,N-diethylformamide, diethylacetamide and y-butyrolactone; and solvents of a low surface tension having a purpose of improving a coating property (poor solvents in many cases), such as alkyl lactate, 3-methyl-3-methoxybutanol, tetralin, isophorone, ethylene glycol monoalkyl ethers such as ethylene glycol monobutyl ether, diethylene glycol monoalkyl ethers such as diethylene glycol monoethyl ether, ethylene glycol monoalkyl or phenyl acetate, triethylene glycol monoalkyl ether, propylene glycol monoalkyl ethers such as propylene glycol monobutyl ether, dialkyl malonate such as diethyl malonate, dipropylene glycol monoalkyl ethers such as dipropylene glycol monomethyl ether, and ester compounds such as acetates thereof.

The varnish composition of the present invention thus obtained is suited mainly to formation of a liquid crystal alignment film for TFT, and because it can provide a suitable pretilt angle, it is useful as well for forming a liquid crystal alignment film for a conventional 90° TN element, STN element, ferroelectric liquid crystal display or antiferroelectric liquid crystal display. Further, it is excellent in electrical characteristics as a liquid crystal display and therefore can be used as well for a protective film and an insulating film.

The liquid crystal alignment film formation step includes coating the varnish composition on a substrate, drying, and heating for dehydrocyclization of the polyamic acid.

A spinner method, a printing method, a dipping method or a dropping method are usually known as a method for carrying out a coating step, and these methods can be applied as well in the present invention. Heating process such as an oven, infrared furnace and hot plate method are widely known and can be applied as well in the present invention.

The drying step is preferably carried out at a relatively low temperature falling in a range where a solvent can be volatilized, and the heat treatment step is preferably carried out at a temperature of usually 150 to 300° C. Preheating can be carried out at a lower temperature before the heat treatment described above.

The varnish composition of the present invention can contain, if necessary, various additives. They may be blended, for example, if imidation is desired to be accelerated, a catalyst suited to such purpose, if the coating property is desired to be elevated, a surfactant suited to such purpose, an antistatic agent if the antistaticity is required to be raised, and a silane coupling agent and a coupling agent of a titanium base if the adhesive property with a substrate is desired to be elevated.

As described above, the varnish composition of the present invention is particularly suited to a liquid crystal alignment film for TFT. The liquid crystal composition for TFT used in this case is preferably a liquid crystal composition comprising at least one liquid crystalline compound selected from those represented by Formulae (9), (10) and (11) described above, but those comprising a liquid crystalline compound having an oxygen-containing group such as an ether group and an ester group as a principal component are not preferred in terms of the electrical characteristics and therefore schould be avoided.

Capable of being given as examples of these liquid crystalline compounds are compounds of (9-1) to (9-9) as the compound represented by Formula (9), compounds of (10-1) to (10-69) as the compound represented by Formula (10) and compounds of (11-1) to (11-24) as the compound represented by Formula (11).

Compounds of (9-1) to (9-9), (10-1) to (10-69) and (11-1) to (11-24):

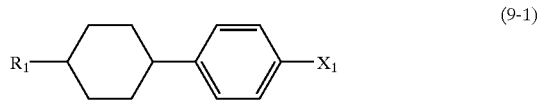

(9-1)

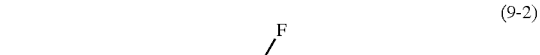

(9-2)

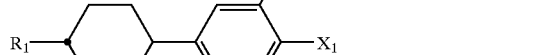

(9-3)

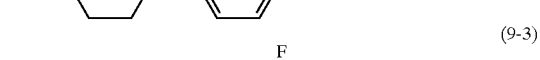

(9-4)

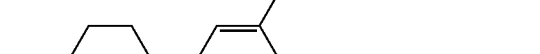

(9-5)

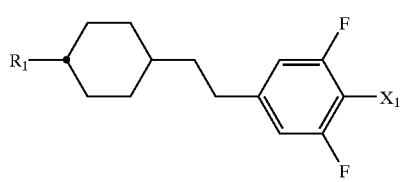 (9-6)
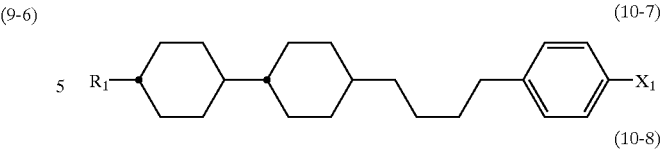 (10-7)
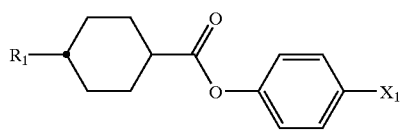 (9-7)
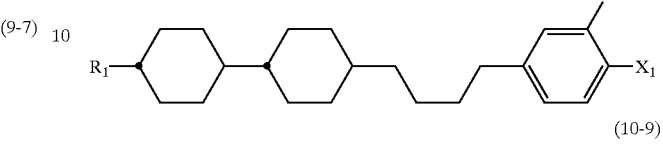 (10-8)
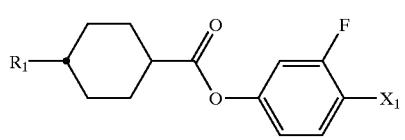 (9-8)
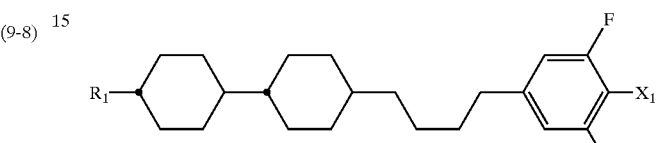 (10-9)
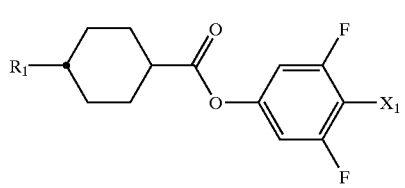 (9-9)
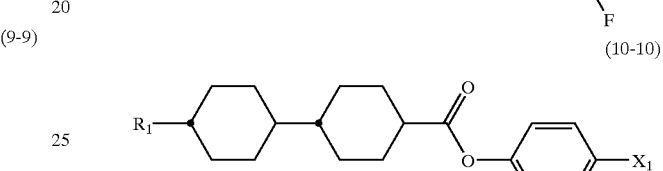 (10-10)
 (10-1)
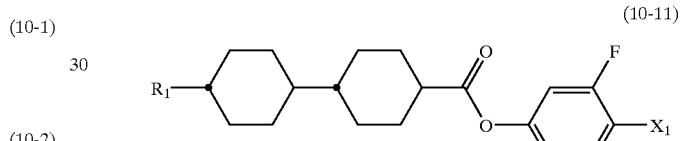 (10-11)
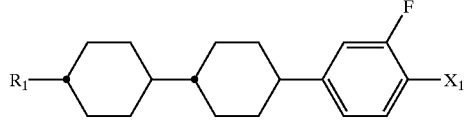 (10-2)
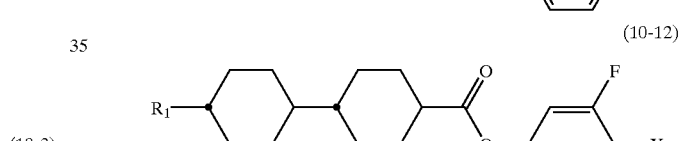 (10-12)
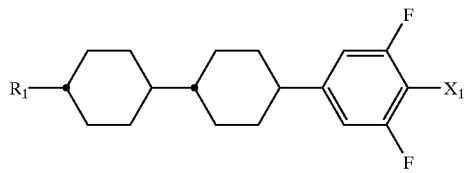 (10-3)
 (10-13)
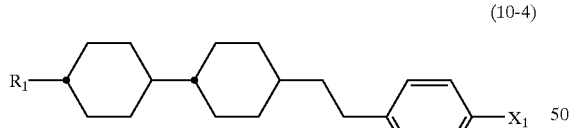 (10-4)
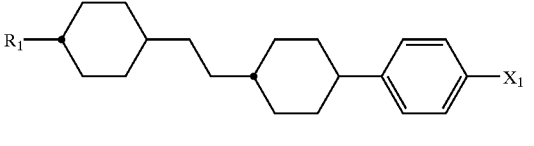 (10-13)
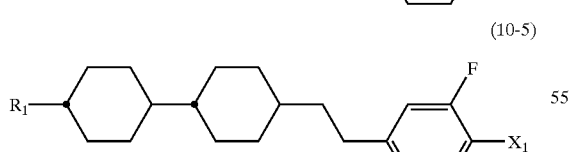 (10-5)
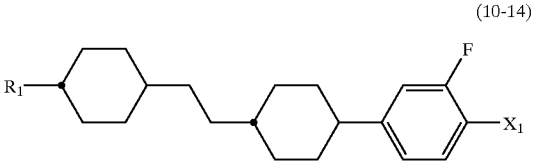 (10-14)
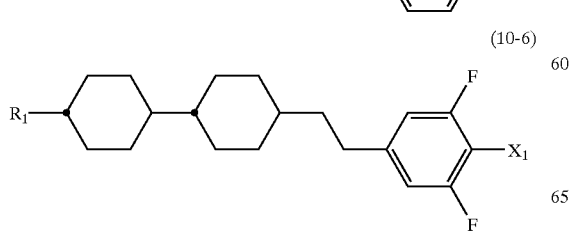 (10-6)
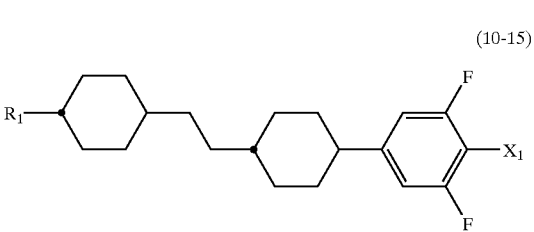 (10-15)

(10-16) 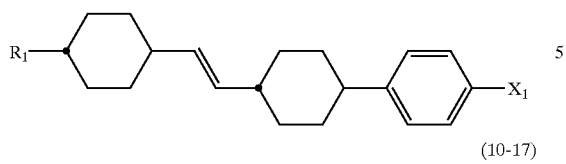
(10-17) 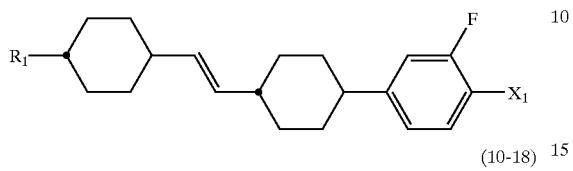
(10-18) 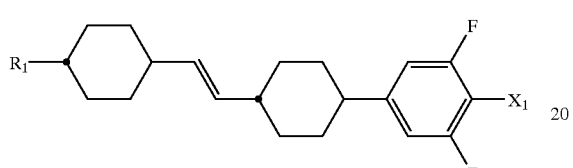
(10-19) 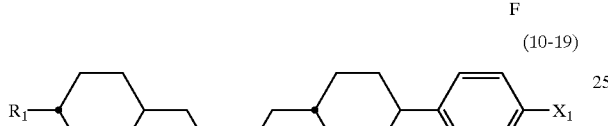
(10-20) 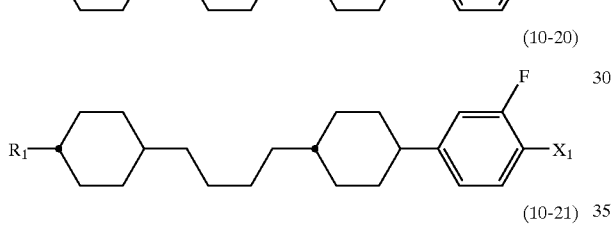
(10-21) 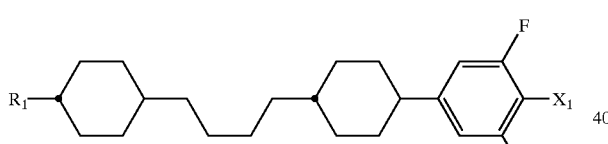
(10-22) 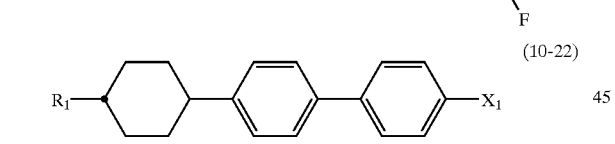
(10-23) 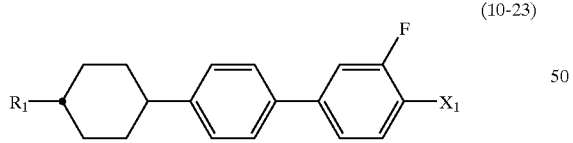
(10-24) 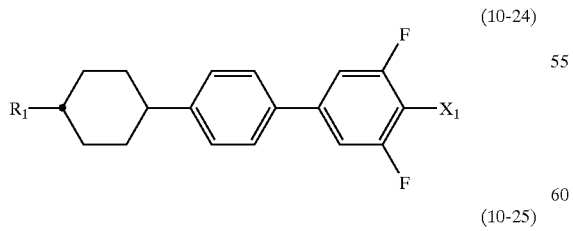
(10-25) 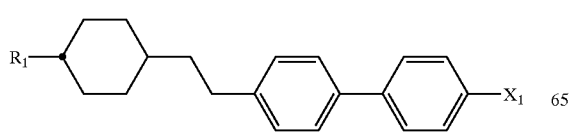
(10-26) 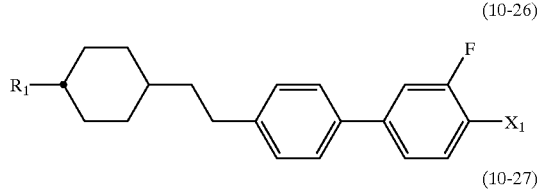
(10-27) 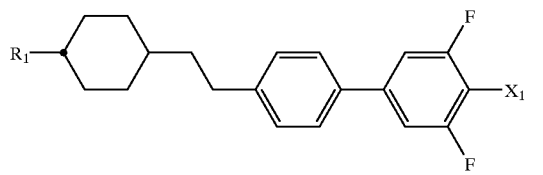
(10-28) 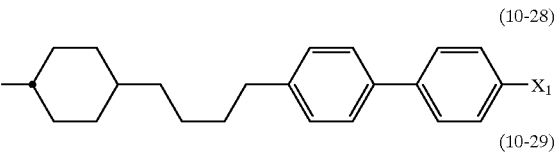
(10-29) 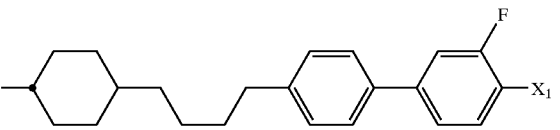
(10-30) 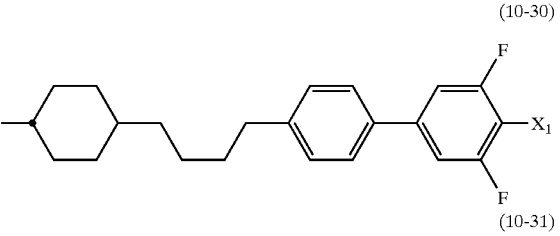
(10-31) 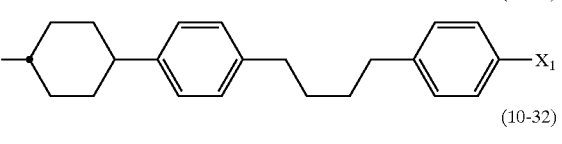
(10-32) 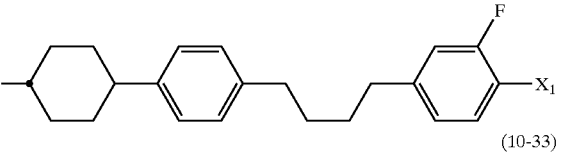
(10-33) 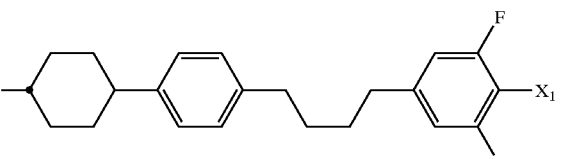
(10-34) 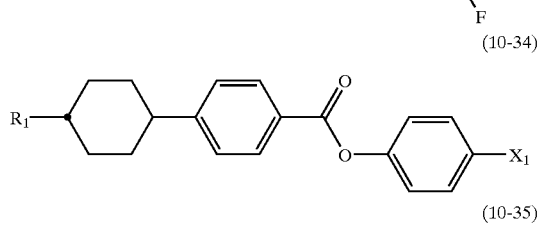
(10-35) 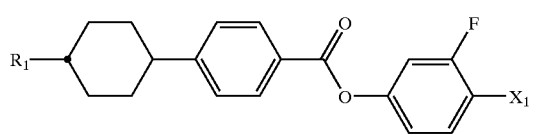

(10-36) 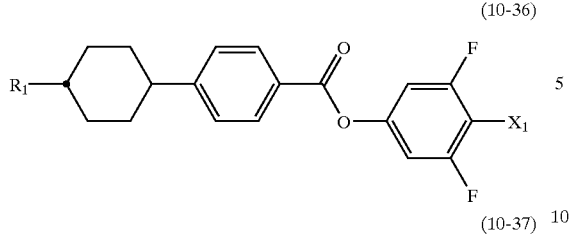
(10-37) 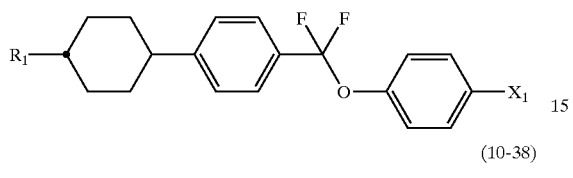
(10-38) 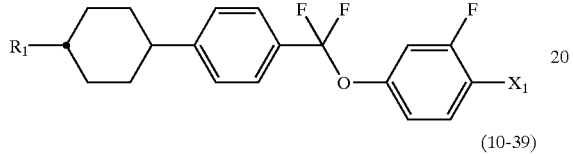
(10-39) 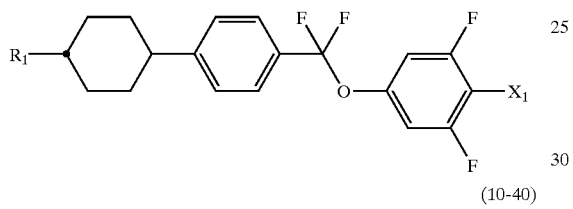
(10-40) 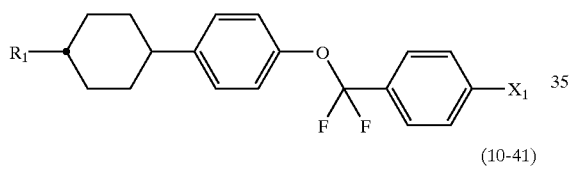
(10-41) 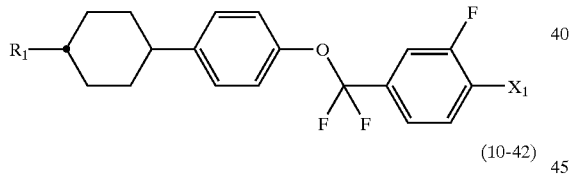
(10-42) 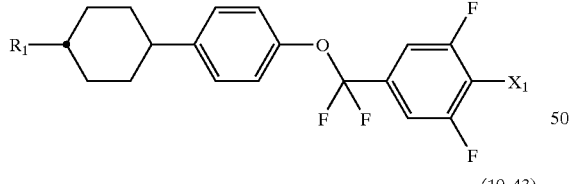
(10-43) 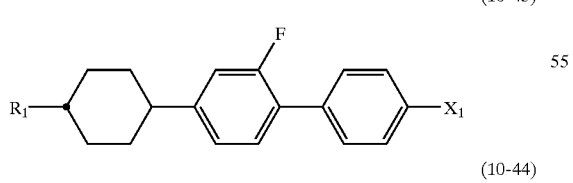
(10-44) 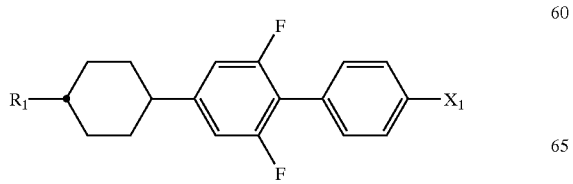
(10-45) 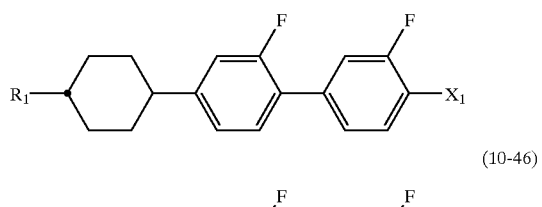
(10-46) 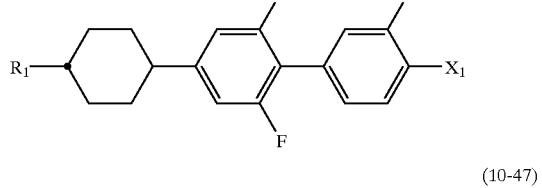
(10-47) 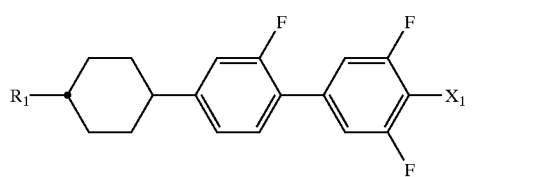
(10-48) 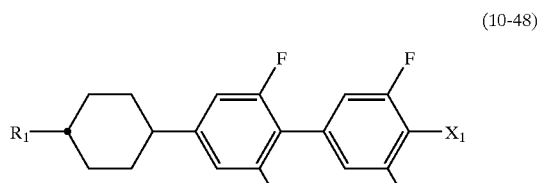
(10-49) 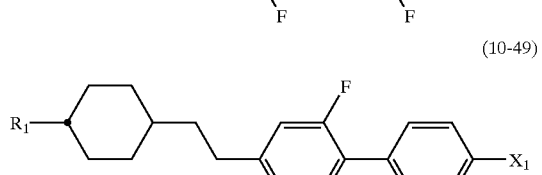
(10-50) 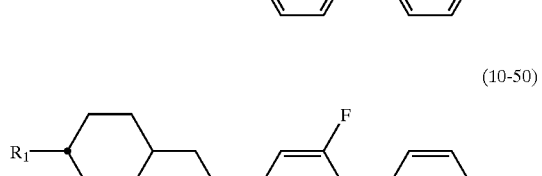
(10-51) 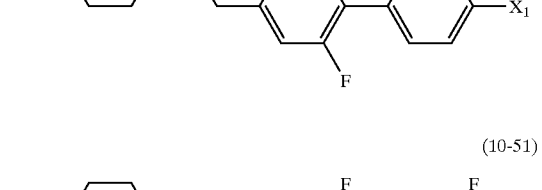
(10-52) 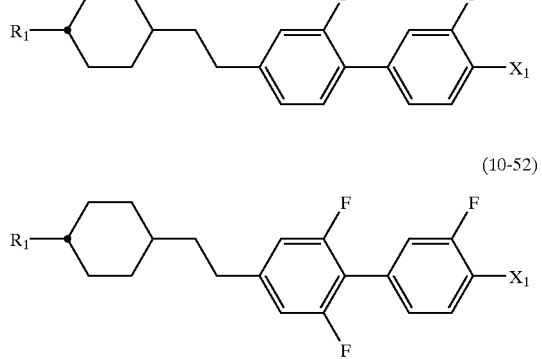

(10-53)
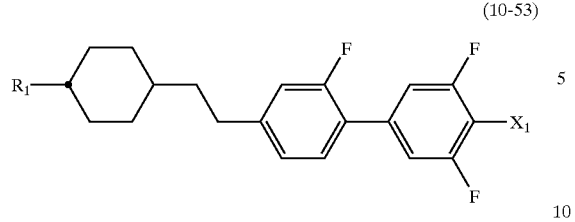
(10-54)
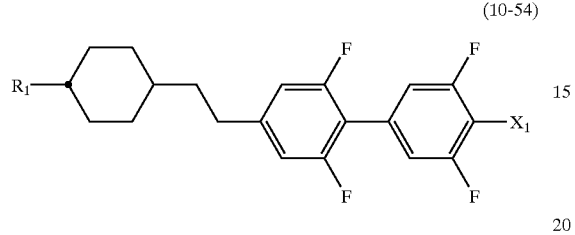
(10-55)
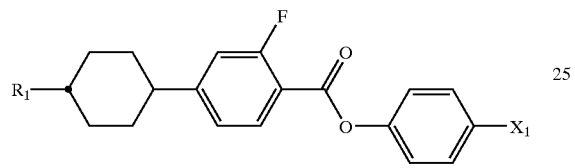
(10-56)
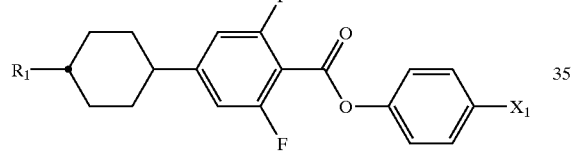
(10-57)
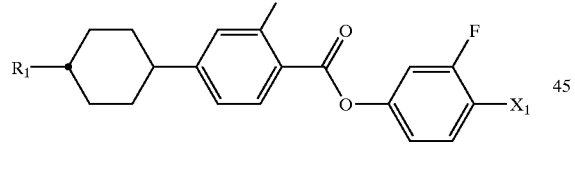
(10-58)
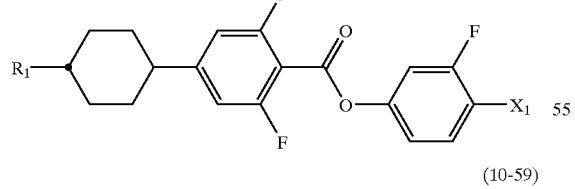
(10-59)
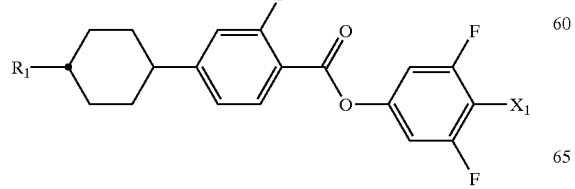
(10-60)
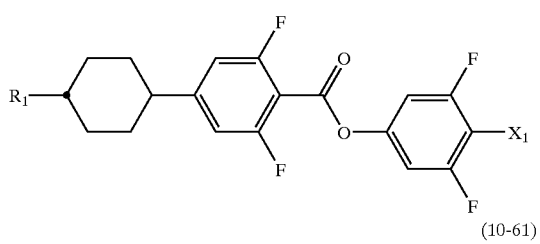
(10-61)
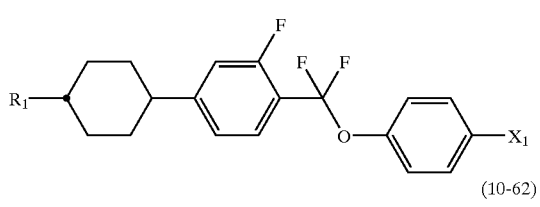
(10-62)
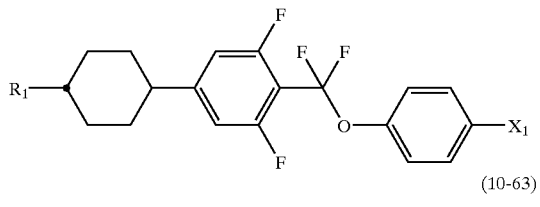
(10-63)
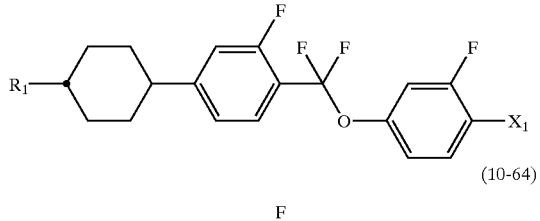
(10-64)
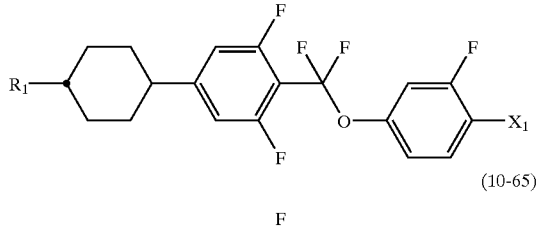
(10-65)
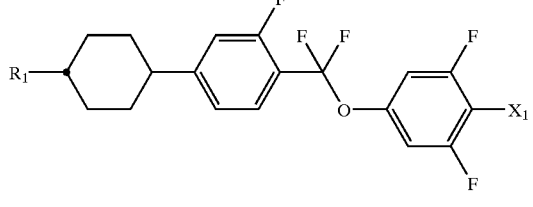
(10-66)
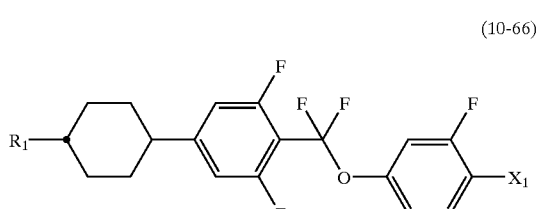
(10-67)
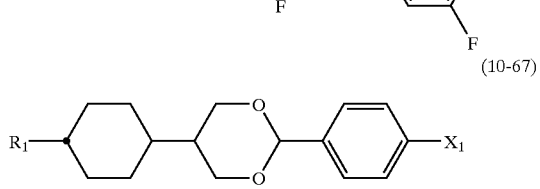

(10-68)
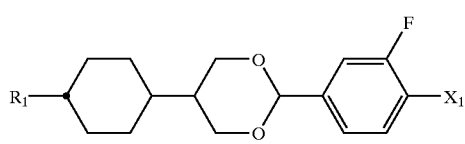
(10-69)
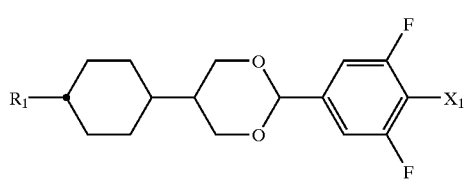
(11-1)
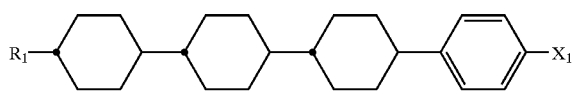
(11-2)
(11-3)
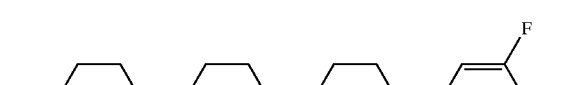
(11-4)
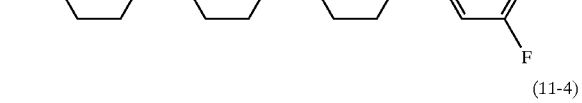
(11-5)
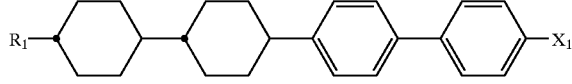
(11-6)
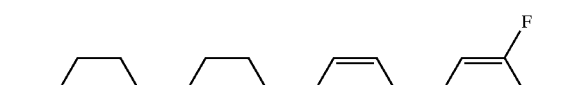
(11-7)
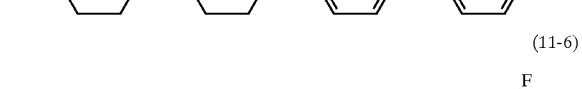
(11-8)
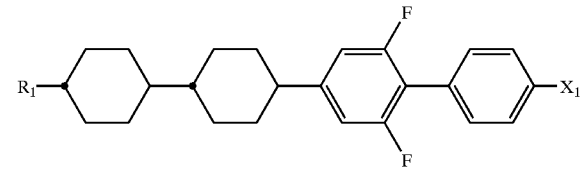
(11-9)
(11-10)
(11-11)
(11-12)
(11-13)
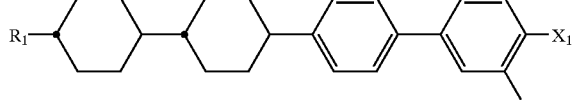
(11-14)
(11-15)
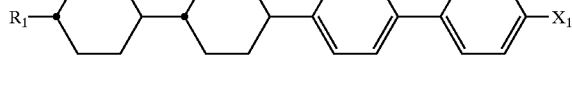
(11-16)

-continued (11-17)
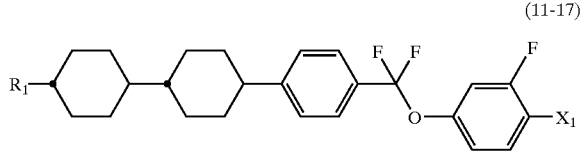

(11-18)
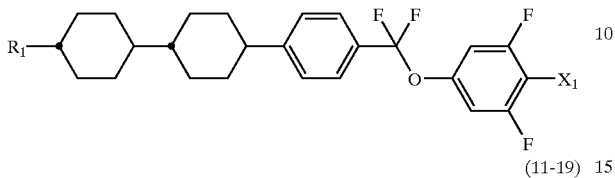

(11-19)
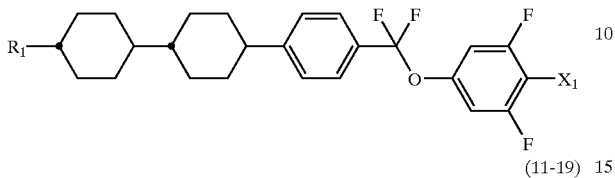

(11-20)
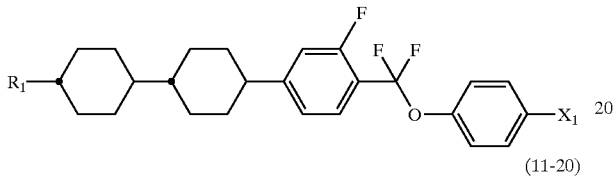

(11-21)
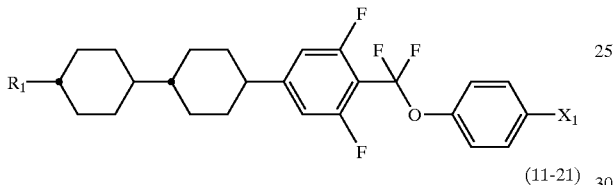

(11-22)
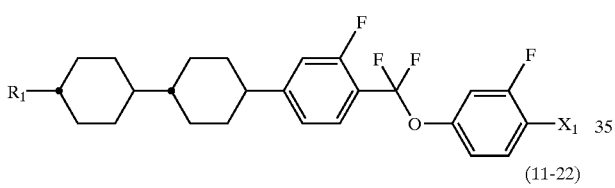

(11-23)
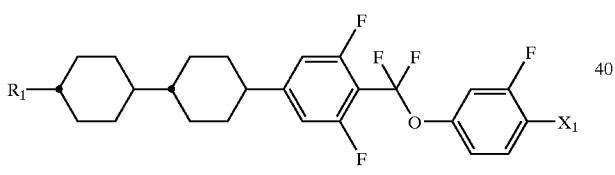

(11-24)
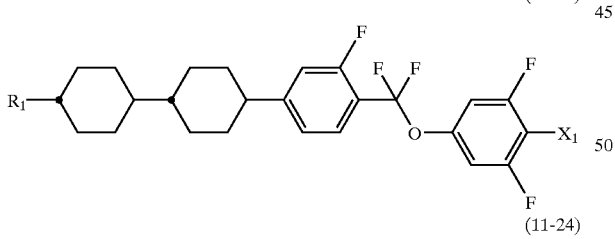

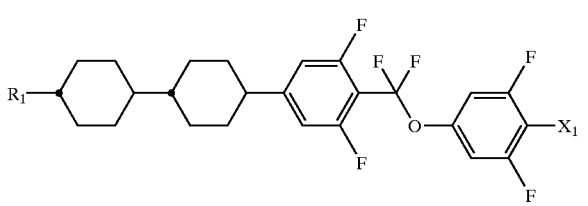

(In the respective formulas, $R_1$ and $X_1$ are synonymous with those described above).

The liquid crystal composition for TFT described above can further contain compounds represented by Formulas (12-1) to (12-8) having a small dielectric anisotropy ($\Delta\epsilon$) in addition to these liquid crystalline compounds.

Compounds of (12-1) to (12-8):

(12-1)
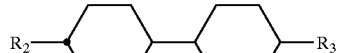

(12-2)
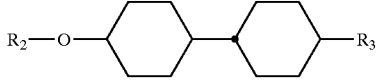

(12-3)
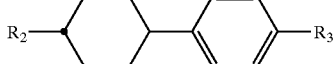

(12-4)

(12-5)
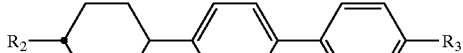

(12-6)
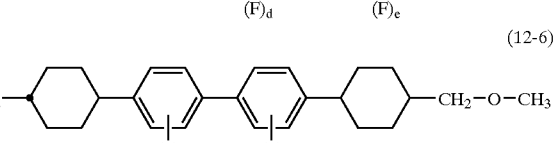

(12-7)
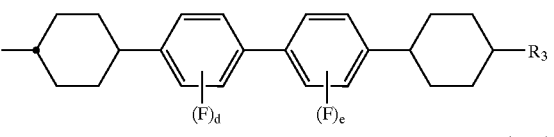

(12-8)
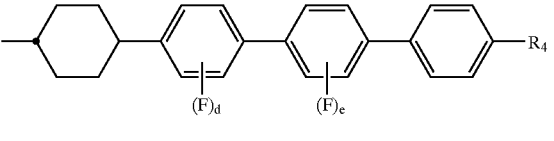

(in the respective formulas, $R_2$ and $R_3$ each represent independently an alkyl group having 1 to 12 carbon atoms; $R_4$ represents an alkyl group having 1 to 12 carbon atoms, a fluorine atom or a chlorine atom; and d and e each are independently 0 or 1).

Examples and shown below. In the respective examples, raw material components to be used are shown by codes referred to the following first item, and amounts, proportions and concentrations of the respective components are based on weight unless otherwise described. Carried out respectively were synthesis of the polymer components by a method referred to the second item, mixing of the varnish composition for forming an alignment film by a method referred to the third item, preparation of a cell for evaluating an alignment film by a method referred to the fourth item and evaluation of a liquid crystal cell by a method referred to the fifth item.

1. Use Raw Materials

| Tetracarboxylic acids | |
| --- | --- |
| Pyromellitic dianhydride | PMDA |
| Cyclobutanetetracarboxylic dianhydride | CBDA |
| 1,2,3,4-Butanetetracarboxylic dianhydride | BTDA |
| Dicarboxylic acids | |
| Terephthalic acid | TPA |
| 1,4'-Dicarboxycyclohexane | DCCh |
| Diamine compounds | |
| 4,4'-Diaminodiphenylmethane | DPM |
| 4,4'-Diaminodiphenylethane | DPEt |
| 4,4'-Diaminodiphenylpropane | DPP |
| 4,4'-Diaminodiphenyl ether | DPEr |
| 1,1-Bis [4-(4-aminophenyl)methyl]-phenyl]-4-n-butylcyclohexane | 4ChB2B |
| 1,1-Bis[4-(4-aminophenyl)methyl]-phenyl]cyclohexane | ChB2B |
| 1,1-Bis(4-aminophenoxy)phenyl-4-(4-pentylcyclohexyl)cyclohexane | 5ChChBOB |
| Solvents | |
| N-methyl-2-pyrrolidone | NMP |
| γ-Butyrolactone | BL |
| Butyl cellosolve | BC |

2. Synthesis of Polymer Component

Synthetic examples of the following four kinds of polymers are shown, and the respective polymers are shown by the following codes.

Polyamic acids (shown by Formula (1))

| Polyamic acids (shown by Formula (1)) | |
| --- | --- |
| When diamine comprises only one represented by Formula (12) | PA Acid B |
| When diamine contains one represented by Formula (16) | PA Acid A |
| Polyamide | |
| When diamine contains one represented by Formula (16) N-substituted PA (shown by Formula (2)) | PA |
| When diamine contains one represented by Formula (16) Side chain group-containing PI (shown by Formula (3)) | NPA |
| When diamine contains one represented by Formula (16) | PI |

1) Synthesis of Polyamic Acid

A 500 ml four neck flask equipped with a thermometer, a stirrer, a material-charging port and a nitrogen-introducing port was charged with 4.8908 g of the diamine compound example DPM and 58.24 ml of dehydrated NMP to stir and dissolve them under dry nitrogen flow. Added were 2.6902 g of the tetracarboxylic acids example PMDA and 2.4190 g of CBDA while maintaining the temperature of the reaction system in a range of 5 to 70° C., and then 53.38 ml of γ-butyrolactone and subsequently 77.68 ml of butyl cellosolve were added to react them for 24 hours, whereby obtained was 200 g of a polyamic acid varnish having a polyamic acid (PA Acid B) concentration of 5%. The polyamic acid had a weight average molecular weight of 75000. The varnish thus obtained was preserved in a freezer of −5° C. or lower.

Varnishes of 5% comprising polyamic acids (PA Acid B2, A1, A2 and A3) having molecular weights shown In Table 1 were obtained respectively in the same manner as described above, except that the diamine compounds were combined with the tetracarboxylic acids as shown in Table 1.

2) Synthesis of Polyamide

A 500 ml four neck flask equipped with a thermometer, a stirrer, a material-charging port and a nitrogen-introducing port was charged with 3.5274 g of the dicarboxylic acid example TPA, 2.7364 g of the diamine compound example DPM and 3.7362 g of 4ChB2B, and 79.08 ml of dehydrated NMP and 20.36 g of pyridine were added thereto to heat them at 60° C., whereby a homogeneous solution was obtained. Added thereto in order were 13.176 g of triphenyl phosphite, 4 g of lithium chloride and 12 g of calcium chloride, and then they were reacted at 100 to 140° C. for 2 hours. The resulting reaction solution was reprecipitated once in methanol and once in refined water, and then the precipitate was dried under reduced pressure to obtain 10 g of polyamide (PA1). This product had a molecular weight (weight average molecular weight) of 98000.

Polyamides (PA2 to 5) having molecular weights shown in Table 2 were obtained respectively in the same manner as described above, except that the dicarboxylic acids were combined with the diamine compounds as shown in Table 2.

3) Synthesis of N-substituted PA

A 200 ml four neck flask equipped with a thermometer, a stirrer, a material-charging port and a nitrogen-introducing port was charged with 3.018 g of the polyamide PA1 obtained in 2) described above and 15.38 ml of dehydrated NMP, and the solution was stirred at a room temperature for a while. Then, 0.615 g of sodium hydride was added, and stirring was further continued for 40 minutes. Added to this solution was 2.001 g of methyl iodide, and then they were further reacted for one hour. The reaction solution thus obtained was reprecipitated once in methanol and once in refined water in the same manner as in 2) described above, and then the precipitate was dried under reduced pressure to obtain 2.19 g of N-substituted PA (NPA1). This product had a molecular weight (weight average molecular weight) of 52000.

N-substituted PA's (NPA2 to 5) having molecular weights shown in Table 3 were obtained respectively in the same manner as described above, except that the polyamides were combined with the substituents as shown in Table 3.

In NPA5, benzyl bromide was used as a substituent-providing compound.

4) Synthesis of Side Chain Group-containing PI

A 200 ml four neck flask equipped with a thermometer, a stirrer, a material-charging port and a nitrogen-introducing port was charged with 6.2252 g of the diamine compound example 4ChB2B and 4.0196 g of 5ChChBOB together with 54.37 ml of dehydrated NMP to stir and dissolve them under dry nitrogen flow.

Added were 1.8681 g of the tetracarboxylic acids example CBDA and 1.8872 g of BTDA while maintaining the temperature of the reaction system in a range of 5 to 70° C., and they were reacted for 24 hours, whereby obtained was about 70 g of a polyamic acid solution having a concentration of 5%. Added to this solution were 70 ml of NMP, 12.6 ml of acetic anhydride and 7.75 ml of pyridine, and they were reacted for 2 hours while maintaining the temperature of the reaction system in a range of 100 to 140° C., whereby a side chain group-containing PI (PI1) was synthesized.

This PI1 was refined through reprecipitation and isolation by adding methanol, dissolution by NMP and reprecipitation by adding refined water and had a weight average molecular weight of 73000 (refer to Table 4).

TABLE 1

Composition of polyamide acids A and B

| Synthetic example | Tetracarboxylic dianhydride | | Diamine component | | | | | Molecular weight |
|---|---|---|---|---|---|---|---|---|
| | | | Formula (12) | | | Formula (16) | | |
| | PMDA | CBDA | DPM | DPEt | ChB2B | 4ChB2B | 5ChChBOB | |
| PA Acid B1 | 25 | 25 | 50 | | | | | 75000 |
| PA Acid B2 | | 50 | 50 | | | | | 85000 |
| PA Acid A1 | 50 | | | 20 | | 30 | | 71000 |
| PA Acid A2 | 50 | | | 20 | 30 | | | 68000 |
| PA Acid A3 | 50 | | 32.5 | | | | 17.5 | 70000 |

TABLE 2

Composition of polyamide

| Synthetic example | Dicarboxylic acid | | Diamine component | | | | Molecular weight |
|---|---|---|---|---|---|---|---|
| | | | Formula (12) | | Formula (16) | | |
| | TPA | DCch | DPM | DPEt | 4ChB2B | 5ChChBOB | |
| PA1 | 50 | | 32.5 | | 17.5 | | 98000 |
| PA2 | 50 | | 32.5 | | | 17.5 | 96000 |
| PA3 | | 50 | 32.5 | | 17.5 | | 83000 |
| PA4 | 50 | | | 32.5 | 17.5 | | 92000 |
| PA5 | 50 | | 32.5 | | 17.5 | | 73000 |

TABLE 3

Composition of N-substituted PA

| Synthetic example | Dicarboxylic acid | | Dianine component | | | | Substituent | Molecular weight |
|---|---|---|---|---|---|---|---|---|
| | | | Formula (12) | | Formula (16) | | | |
| | TPA | DCch | DPM | DPEt | 4ChB2B | 5ChChBOB | | |
| NPA1 | 50 | | 32.5 | | 17.5 | | Methyl | 52000 |
| NPA2 | 50 | | 32.5 | | | 17.5 | Methyl | 71000 |
| NPA3 | | 50 | 32.5 | | 17.5 | | Methyl | 65000 |
| NPA4 | 50 | | | 32.5 | 17.5 | | Methyl | 63000 |
| NPA5 | 50 | | 32.5 | | 17.5 | | Benzyl | 49000 |

TABLE 4

Composition of side chain group-containing PI

| Synthetic example | Dicarboxylic dianhydride | | Diamine component (Formula 16) | | Molecular weight |
|---|---|---|---|---|---|
| | CBDA | BTDA | 4ChB2B | 5ChChBOB | |
| pI1 | 25 | 25 | 32.5 | 17.5 | 73000 |

3. Preparation of Varnish Composition for Forming an Alignment Film

1) Preparation of Polyamic Acid-alone Varnish

The varnishes having a polymer concentration of 5% obtained in 2. 1) described above were diluted with a diluent solvent (NMP/BC=50/50, hereinafter the same shall apply) so that the polymer concentration became 3% to prepare a varnish for forming an alignment film.

2) Preparation of Polyamide-alone Varnish

The polyamide obtained in 2. 2) described above was first dissolved in NMP, and BL and then BC were added in order thereto to prepare a varnish comprising 5% of polyamide, 30% of NMP, 30% of BL and 35% of BC. Then, this was diluted with the diluent solvent of NMP/BC=50/50 described above so that the polyamide concentration became 3% to prepare a varnish for forming an alignment film.

3) Preparation of Side Chain Group-containing PI-alone Varnish

Prepared in the same manner as described above (preparation of polyamide varnish).

4) Preparation of N-substituted PA-alone Varnish

Prepared in the same manner as described above (preparation of polyamide varnish).

5) Preparation of Mixed Varnish Composition Comprising Plural Polymer Components Varnishes for alignment films containing plural polymers were prepared by mixing varnishes comprising 5% of a single polymer, and then diluted with a disolvent of NMP/BC=50/50 (by weight) to 3%. The polymer compositions are listed in table 6, 7 and 8.

4. Preparation of Cell for Evaluating Alignment Film

1) Preparation of Cell for Evaluating Residual Charge and Voltage-holding Ratio

The each varnish composition for forming an alignment film described above was coated on a transparent electrode (glass substrate having thereon ITO electrode) by means of a spinner and prebaked at 80° C. for about 5 minutes. Then, they were subjected to heat treatment at 200° C. for about 30 minutes to form alignment films. The substrate surfaces after forming the alignment films were subjected to aligning treatment by rubbing with a rubbing apparatus, sprayed with a gapping material for 7 μm was sprayed thereon. Two substrates were combined with the rubbed surface inside each other and their rubbing direction being anti-parallel, and sealed its periphery with an epoxy curing agent leaving a liquid crystal-charging port. Anti-parallel cells with a gap of 7 μm were thus prepared.

This cell was charged with a liquid crystal composition (NI point: 81.3° C., birefringence: 0.092) comprising the following components and the liquid crystal-charging port was sealed with a UV curing agent by UV light, and then it was subjected to heat treatment at 110° C. for 30 minutes to prepare a cell for evaluating a residual charge and a voltage-holding ratio.

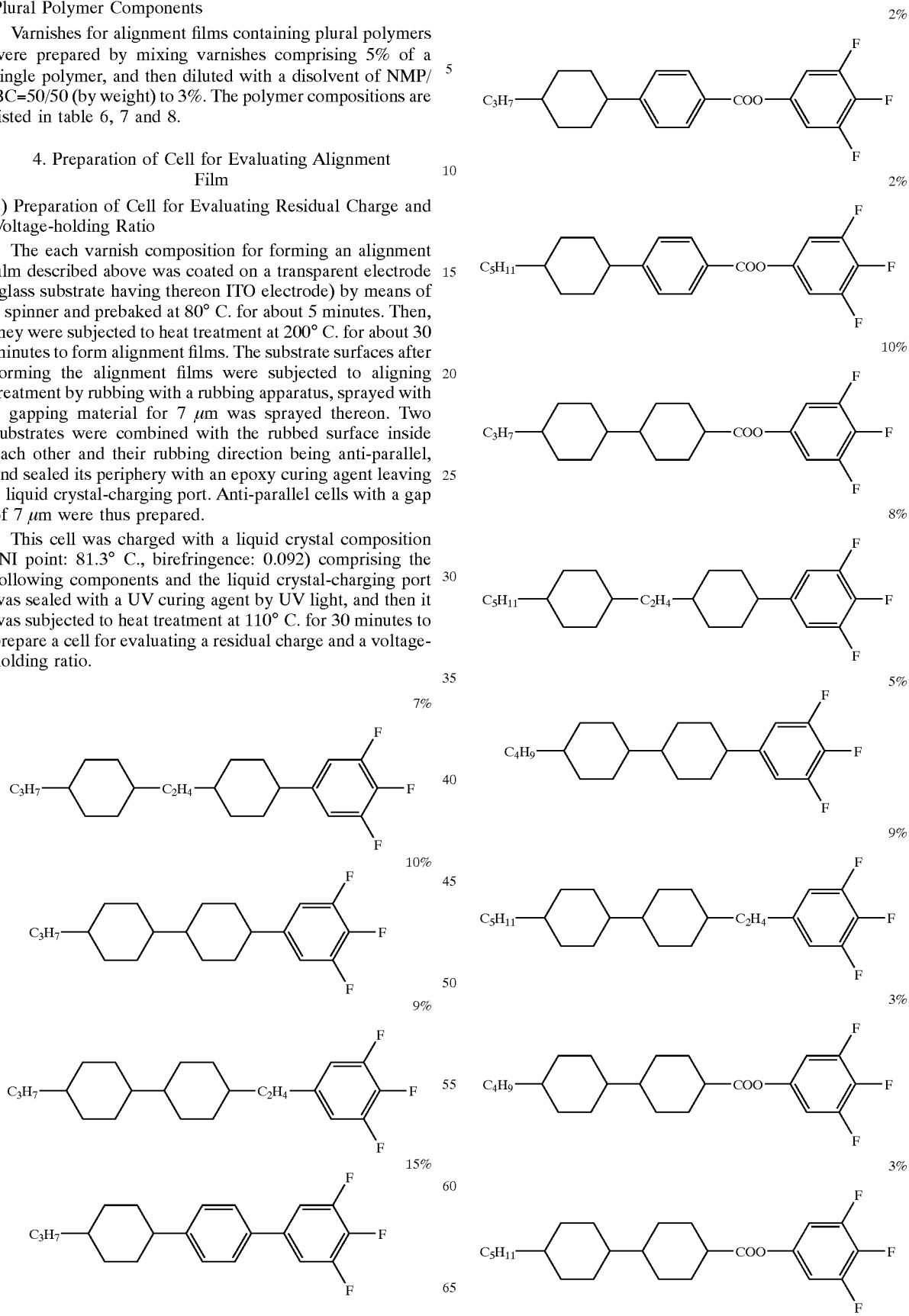

-continued

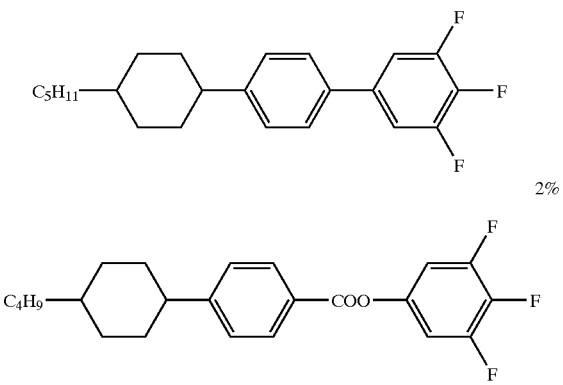

15%

2%

2) Preparation of Cell for Evaluating Image Sticking

A cell having a gap of 9 μm was prepared in the same manner as in preparation of the cell for evaluating a residual charge and a voltage-holding ratio described above, except that the gapping material for 7 μm was changed to a gapping material for 9 μm and the liquid crystal composition was changed to a composition containing further 0.25% of cholesteryl nonanoate and that the antiparallel cell was changed to a 90° twisted cell. Then, the liquid crystal composition was charged thereinto, and it was subjected to the subsequent treatment to prepare a cell for evaluating image sticking.

3) Preparation of Cell for Measuring Pretilt Angle

An antiparallel cell having a cell thickness of 20 μm was prepared in the same manner as in preparation of the cell for evaluating a residual charge described above, except that a gapping material for 20 μm was substituted for the gapping material for 9 μm. Then, the liquid crystal composition was charged thereinto, and it was subjected to the subsequent treatment to prepare a cell for measuring a pretilt angle.

5. Evaluation of Liquid Crystal Cell

1) Measuring Method for Residual Charge

Figure 2:
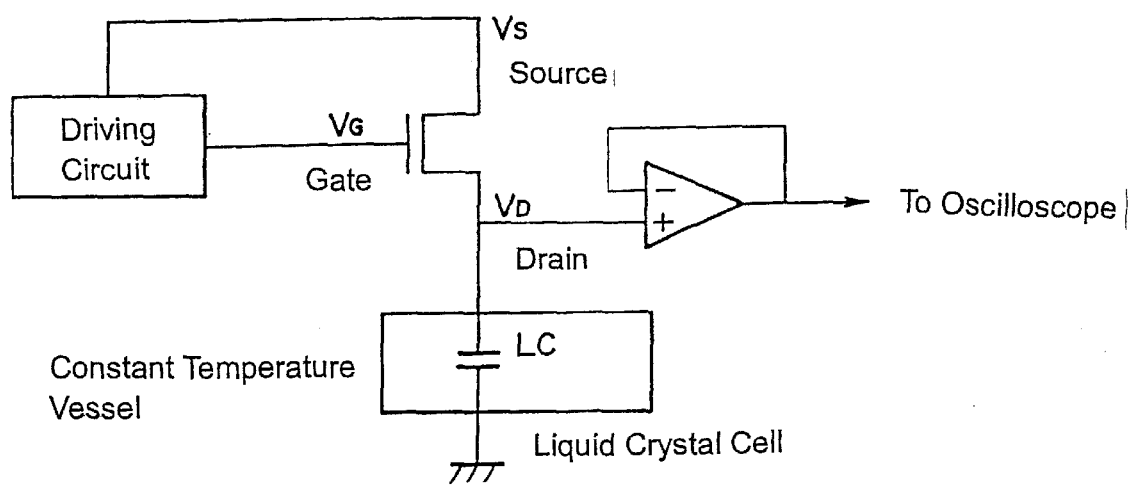
FIG. 2 shows a circuit diagram used for measuring a voltage holding ratio.
Figure 3:
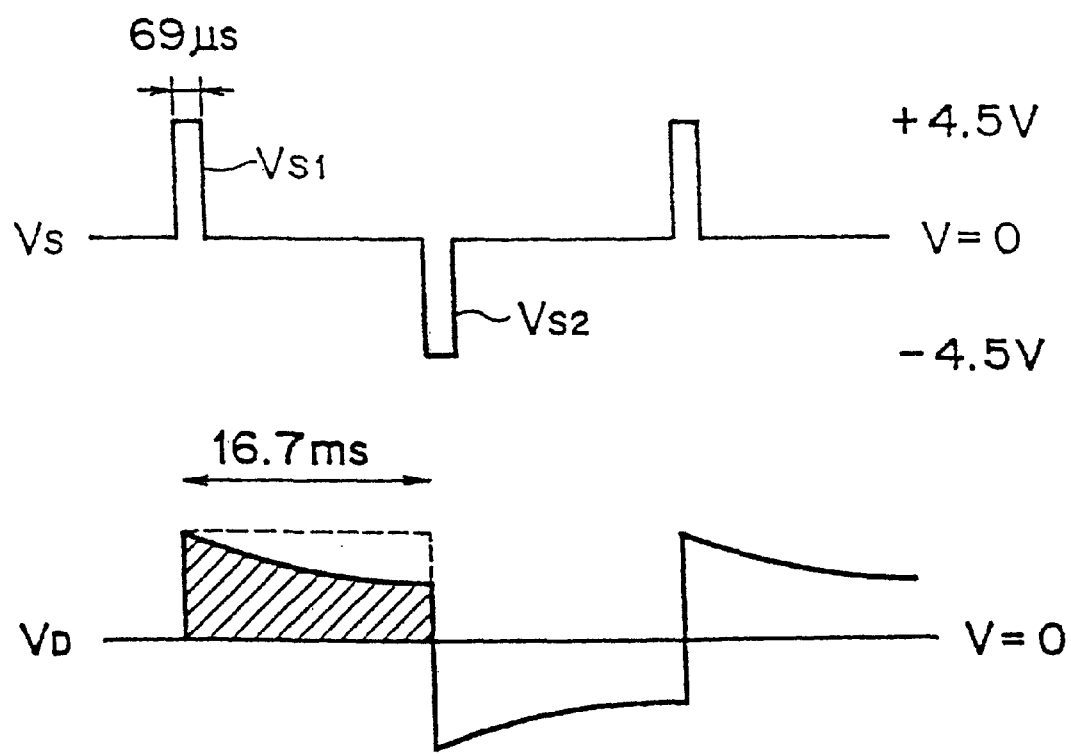
FIG. 3 shows wave forms of applied voltage (upper) and cell voltage (under part).

FIG. 1 is an illustration showing a C-V hysteresis curve; FIG. 2 is a circuit diagram used for determining a voltage-holding ratio; and FIG. 3 is an illustration showing a rectangular wave $V_s$ observed in a gate pulse width of 69 μs, a frequency of 60 Hz and a wave height of ±4.5 V and a wave form $V_d$ observed when $V_s$ is applied to a source of a circuit shown in FIG. 2 and read from an oscilloscope.

The residual charge was determined by a method measuring the C-V characteristic shown in FIG. 1. That is, an ac voltage of 50 mV with 1 kHz was applied to the liquid crystal cell, and a triangle wave of a direct current (DC) having a frequency of 0.0036 Hz was further superposed thereon. Then, the DC voltage was swept in a manner of 0 V→+10 V→0 V→−10 V→0 V to determine a width of hysteresis shown in FIG. 1 as a residual charge from the following equation. The residual charge was measured at 60° C.

Residual charge $(V)=(|\alpha 1-\alpha 2|+|\alpha 4-\alpha 3|)/2$

2) Measuring Method for Voltage-holding Ratio

As shown in FIG. 2 and FIG. 3, a rectangular wave ($V_s$) having a gate width of 69 μs, a frequency of 60 Hz and a wave height of ±4.5 V was applied to a source, and a changing drain ($V_p$) was read from an oscilloscope to calculate the voltage-holding ratio from the following.

Supposing that the voltage-holding ratio is 100%, $V_p$ forms a rectangle shown by dotted lines but is usually lowered gradually as shown by solid lines.

The voltage-holding ratio was calculated from an area of oblique lines and an area of broken lines and shown by a percentage of an area in an oblique line part, and therefore 100% is a maximum value. The voltage-holding ratio was measured at 60° C.

3) Evaluating Method for Image Sticking

A DC voltage of 5 V was applied to the cell at 60° C. for 3 hours for evaluating image sticking. Then, an AC voltage of 4 V (frequency: 0.01 Hz) was applied thereto at a room temperature to visually evaluate a state of image sticking generated under orthogonal nicols. Evaluation of image sticking was judged according to the following criteria:

○: no image sticking observed,

Δ: a little image sticking observed, and

X: image sticking observed.

4) Measuring Method for Pretilt Angle

Measured by a crystal rotation method which is usually carried out.

5) Evaluating Method for Coating Property

The cissing property was evaluated in coating the varnish composition on the transparent electrode by means of a spinner which was carried out in preparing the cell for evaluating an alignment film described above. It was judged based on the following criteria:

○: no cissing observed,

Δ: cissing produced on the periphery of the substrate, and

X: cissing to the central part of the substrate.

6) Evaluating Method for Orientation

The cell used in measuring a pretilt angle was observed under a polarization microscope to check and judge the presence of inferior orientation of a liquid crystal layer:

○: no inferior orientation observed, and

X: inferior alignment observed.

COMPARATIVE EXAMPLES 1 to 13

The varnishes (refer to 1) to 4) of 3. described above) having a concentration of 3% and containing alone the respective polymers shown in the polymer column of Table 5 as the polymer component were used to prepare cells for evaluating an alignment film, and the cells thus obtained were evaluated by the method shown in 5. described above. The samples in which a pretilt angle could not be determined because of an inferior aligning property were stopped evaluating the other items.

As apparent from the results shown in Table 5, when the varnishes containing a single polymer falling outside the scope of the present invention were used as an alignment film material, unavoidable are the defects that particularly the image sticking and the orientation property of liquid crystal cells are deteriorated and the coating property in preparing the cells degraded.

TABLE 5

Evaluation of various polymers

| Comparative Example | Polymer | Pretilt angle (°) | Voltage-holding ratio (%) | Residual charge (mV) | Image sticking | Orientation property | Coating property |
|---|---|---|---|---|---|---|---|
| 1 | PA Acid B1 | 1.0 | 98.0 | 180 | X | ○ | ○ |
| 2 | PA Acid A1 | 5.7 | 96.2 | 580 | X | ○ | ○ |
| 3 | PA Acid A2 | 2.8 | 96.5 | 630 | x | ○ | ○ |
| 4 | PA Acid A3 | 7.5 | 95.5 | 840 | X | ○ | ○ |
| 5 | PA1 | 5.5 | 94.8 | 561 | X | ○ | Δ |
| 6 | PA2 | 7.0 | 94.1 | 433 | X | ○ | Δ |
| 7 | PA3 | 4.8 | 93.8 | 682 | X | ○ | Δ |
| 8 | NPA1*[1] | ITM*[2] | — | — | — | X | ○ |
| 9 | NPA2*[1] | ITM*[2] | — | — | — | X | ○ |
| 10 | NPA3*[1] | ITM*[2] | — | — | — | X | ○ |
| 11 | NPA4*[1] | ITM*[2] | — | — | — | X | ○ |
| 12 | NPA5*[1] | ITM*[2] | — | — | — | X | ○ |
| 13 | PI1 | 3.0 | 96.6 | 396 | ○ | ○ | X |

*[1]Interference peaks do not come out in pretilt of these samples (it is considered that inferior alignment causes it)
*[2]Impossible to measure

COMPARATIVE EXAMPLES 14 to 23

Varnishes were prepared in the same manner as in Comparative Examples 1 to 13, except that the polymer components were changed from a single kind of the polymers to mixtures of two kinds of the polymers as shown in the varnish composition column of Table 6. Then, cells were prepared, and the cells thus obtained were evaluated in the same manners.

The polymer mixtures described above are divided roughly into those containing only the polyamic acids (Comparative Examples 14 to 19 and 22) and those containing the polyamic acids, the side chain group-containing PI or the N-substituted PA and PA (Comparative Examples 20, 21 and 23). However, all of them fall outside the scope of the present invention.

As apparent from the results shown in Table 6, it can be found that the former (mixtures containing only the polyamic acids) is improved in a voltage-holding ratio and a residual charge but still remains in a problematic level in terms of image sticking. On the other hand, the latter (containing the polyamic acid and the side chain group-containing PI) is observed to be improved in image sticking, but there are problems such as a difficulty in a residual charge and a coating property, a small voltage-holding ratio and a large residual charge, and they are not satisfactory for an aligning agent in terms of a total balance.

TABLE 6

Evaluation of mixed systems

| Comparative Example | Vanish composition PA Acid 3/blend polymer = blend ratio (weight ratio) | Pretilt angle (°) | Voltage-holding rate (%) | Residual charge (mV) | Image Sticking | Orientation property | Coating property |
|---|---|---|---|---|---|---|---|
| 14 | PA Acid B1/PA Acid A1 = 90/10 | 6.3 | 98.2 | 9 | X | ○ | ○ |
| 15 | PA Acid B1/PA Acid A1 = 80/20 | 6.2 | 98.0 | 21 | X | ○ | ○ |
| 16 | PA Acid B1/PA Acid A2 = 90/10 | 2.6 | 98.2 | 10 | X | ○ | ○ |
| 17 | PA Acid B1/PA Acid A2 = 80/20 | 3.1 | 97.9 | 25 | X | ○ | ○ |
| 18 | PA Acid B1/PA Acid A3 = 90/10 | 9.1 | 97.8 | 18 | X | ○ | ○ |
| 19 | PA Acid B1/PA Acid A3 = 80/20 | 8.9 | 97.5 | 75 | X | ○ | ○ |
| 20 | PA Acid B1/PI1 = 90/10 | 1.5 | 97.2 | 89 | Δ | ○ | Δ |
| 21 | PA Acid B1/PI1 = 80/20 | 2.7 | 96.9 | 127 | ○ | ○ | Δ |
| 22 | PA Acid B2/PA Acid A1 = 90/10 | 6.2 | 98.1 | 35 | X | ○ | ○ |
| 23 | PA Acid B1/PA1 = 90/10 | 1.8 | 97.5 | 121 | X | ○ | ○ |

EXAMPLES 1 to 12

Varnishes were prepared in the same manner as in Comparative Examples 1 to 13, except that the polymer components were changed to mixtures comprising two kinds of the polymers falling in the scope of the present invention (PA Acid B+NPA, provided that three kinds of PA Acid B+NPA+ PI in Example 12). Then, cells were prepared, and the cells thus obtained were evaluated in the same manners.

As apparent from the results shown in Table 7, it can be found that in any of the examples, the excellent characteristics are shown all over the respective evaluation items and that a liquid crystal alignment film having well balanced characteristics is obtained.

TABLE 7

Evaluation of various mixed systems

| | | Evaluation items | | | | | |
|---|---|---|---|---|---|---|---|
| Example | Vanish composition PA Acid B1/blend polymer = blend ratio (weight ratio) | Pretilt angle (°) | Voltage-holding ratio (%) | Residual charge (mV) | Image sticking | Orientation property | Coating property |
| 1 | PA Acid B1/NPA1 = 90/10 | 2.2 | 98.4 | 10 | ○ | ○ | ○ |
| 2 | PA Acid B1/NPA1 = 80/20 | 2.0 | 98.3 | 18 | ○ | ○ | ○ |
| 3 | PA Acid B1/NPA2 = 90/10 | 4.5 | 98.3 | i5 | ○ | ○ | ○ |
| 4 | PA Acid B1/NPA2 = 80/20 | 5.8 | 98.2 | 22 | ○ | ○ | ○ |
| 5 | PA Acid B1/NPA3 = 90/10 | 2.3 | 98.5 | 4 | ○ | ○ | ○ |
| 6 | PA Acid B1/NPA3 = 80/20 | 2.5 | 98.4 | 6 | ○ | ○ | ○ |
| 7 | PA Acid B1/NPA4 = 90/10 | 2.4 | 98.3 | 14 | ○ | ○ | ○ |
| 8 | PA Acid B1/NPA4 = 80/20 | 3.3 | 98.0 | 15 | ○ | ○ | ○ |
| 9 | PA Acid B1/NPA5 = 90/10 | 2.0 | 98.2 | 8 | ○ | ○ | ○ |
| 10 | PA Acid B1/NPA5 = 80/20 | 1.8 | 98.1 | 12 | ○ | ○ | ○ |
| 11 | PA Acid B2/NPA1 = 80/20 | 2.1 | 98.3 | 45 | ○ | ○ | ○ |
| 12 | PA Acid B1/NPA1/P1 = *1 | 2.0 | 98.1 | 22 | ○ | ○ | ○ |

*1: 80/10/10

EXAMPLES 13 to 24

Varnishes were prepared in the same manner as in Examples 1 to 11, except that the blending percentage of PA Acid B to NPA as changed. Then, cells were prepared, and the cells thus obtained were evaluated in the same manners. The results thereof are shown in Table 8 together with those obtained in Comparative Examples 1 to 8 and Examples 3 and 4.

As apparent from the results shown in Table 8, it can be found that in any of Examples 13 to 24, when the blending percentage of NPA was very small as much as 3%, the excellent characteristics were shown through the respective evaluation items excluding that a little image sticking was shown to be present in [image sticking] of the evaluation items.

The pretilt angle is saturated in about 5° in the mixed system of NPA2, and it is saturated in about 20° in the NPA1 system. In these cases, it is not advantageous to add 40% or more of the NPA components, and 5 to 10% in the former and 20 to 30% in the latter are the preferred ranges from the viewpoint of a stability in the pretilt angle and the electrical characteristics.

TABLE 8

Evaluation of blend ratio dependency in mixed systems

| | | Evaluation items | | | | | |
|---|---|---|---|---|---|---|---|
| Example & Comparative Example | Vanish composition PA Acid B1/NPA1 = blend ratio (weight ratio) | Pretilt angle (°) | Voltage-holding ratio (%) | Residual charge (mV) | Image sticking | Orientation property | Coating property |
| Comparative Example 1 | PA Acid B1 = 100 | 1.0 | 98.0 | 180 | X | ○ | ○ |
| Example 13 | 98/3 | 1.6. | 98.1 | 60 | Δ | ○ | ○ |
| Example 14 | 95/5 | 2.2 | 98.3 | 10 | ○ | ○ | ○ |
| Example 15 | 90/10 | 2.2 | 98.4 | 10 | ○ | ○ | ○ |
| Example 16 | 85/15 | 2.1 | 98.2 | 15 | ○ | ○ | ○ |
| Example 17 | 80/20 | 2.0 | 98.3 | 18 | ○ | ○ | ○ |
| Example 18 | 60/40 | 1.9 | 98.0 | 35 | ○ | ○ | ○ |
| Example 19 | 40/60 | 2.0 | 97.2 | 51 | ○ | Δ | ○ |
| Comparative Example 8 | NPA1 = 100 | *1 | — | — | — | — | ○ |
| | PA Acid B1/NPA2 | | | | | | |
| Example 20 | 98/3 | 1.8 | | | Δ | ○ | ○ |
| Example 21 | 95/5 | 3.2 | 98.3 | 10 | ○ | ○ | ○ |
| Example 3 | 90/10 | 4.5 | 98.4 | 10 | ○ | ○ | ○ |
| Example 22 | 85/15 | 5.0 | 98.2 | 15 | ○ | ○ | ○ |
| Example 4 | 80/20 | 5.8 | 98.3 | 18 | ○ | ○ | ○ |
| Example 23 | 60/40 | 6.2 | 98.0 | 32 | ○ | ○ | ○ |
| Example 24 | 40/60 | 6.0 | 97.7 | 44 | ○ | Δ | ○ |
| Comparative Example 9 | NPA2 = 100 | *2 | — | — | — | X | ○ |

*1 impossible to measure
*2 impossible to measure

INDUSTRIAL APPLICABILITY

As explained above, capable of being provided according to the present invention is a varnish composition which can achieve electrical characteristics such as a residual charge, a voltage-holding ratio and image sticking and various characteristics such as a pretilt angle, a coating property and an orientation property totally with good balance, which are desired to a liquid crystal alignment film which is prepared therefrom.

What is claimed is:

1. A varnished composition comprising
a polymer composition comprising a polyamic acid represented by Formula (1):

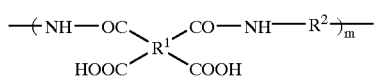
(1)

wherein $R^1$ represents a tetravalent organic residue originating in tetracarboxylic acids which is given by removing carboxyl groups, and $R^2$ represents a divalent organic residue originating in diamines which is given by removing amino groups: a polyamide represented by Formula (2):

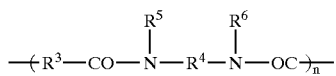
(2)

wherein $R^3$ represents a divalent organic residue originaing in dicarboxylic acids which is given by removing carboxyl groups; $R^4$ represents a divalent organic residue originating in diamines which is given by removing amino groups; at least one of $R^5$ and $R^6$ represents a group selected from monovalent organic groups, and the other represents hydrogen or a group selected from monovalent organic groups; and when both are groups selected from the orgasic groups, they may have the same structure or different structures: and a soluble polyimide represented by Formula (3):

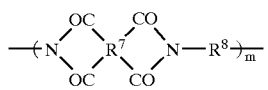
(3)

wherein $R^7$ represents a tetravalent organic residue originating in tetacarboxylic acids which is given by removing carboxyl groups; $R^8$ represents a divalent organiic residue originating in diamines which is given by removing amino groups; and at least one of $R^7$ and $R^8$ contains a group having a side chain group; and a solvent for dissolving this polymer composition,
wherein said polymer composition contains 1 to 60% by weight of the polyamide represented by Formula (2) and the soluble polyimide represented by Formula (3) in total based on the polymer composition, and said varnish composition contains 0.1 to 40% by weight of the polymer composition.

2. The varnish composition as described in claim 1, wherein the tetracarboxylic acids giving $R^1$ comprise cyclobutanetetracarboxylic dianhydride and butanetetracarboxylic dianhydride.

3. The varnish composition as described in claim 1, wherein the tetracarboxylic acids giving $R^1$ comprise an alicyclic tetracarboxylic acid as an essential component.

4. The varnish composition as described in claim 1, wherein the tetracarboxylic acids giving $R^1$ comprise an alicyclic tetracarboxylic acid and, an aromatic tetracarboxylic acid or/and an aliphatic tetracarboxylic acid as essential components.

5. The varnish composition as described in claim 4, wherein the alicyclic tetracarboxylic acid is cyclobutanetetracarboxylic dianhydride.

6. The varnish composition as described in claim 4, wherein the alicyclic tetracarboxylic acid is cyclobutanetetracarboxylic dianhydride, and the aromatic tetracarboxylic acid is pyromellitic dianhydride.

7. The varnish composition as described in claim 1, wherein the tetracarboxylic acids giving $R^7$ comprise alicyclic and/or aliphatic tetracarboxylic acids as an essential component.

8. The varnish composition as described in claim 1, wherein the tetracarboxylic acids giving $R^7$ comprise an acid dianhydride selected from the group consisting of tricarboxycyclopentylacetic dianhydride, 3,4dicarboxy-1,2,3,4-tetrahydronaphthalene-1-succinic dianhydride and butanetetracarboxylic acid dianhydride as an essential component.

9. The varnish composition as described in claim 1, wherein the diamines giving $R^8$ comprise diamines having a side chain having 3 or more carbon atoms.

10. The varnish composition as described in claim 1, wherein $R^8$ in Formula (3) contains one selected from divalent organic residues originating in diamines which is given by removing amino groups, represented by Formula (7);

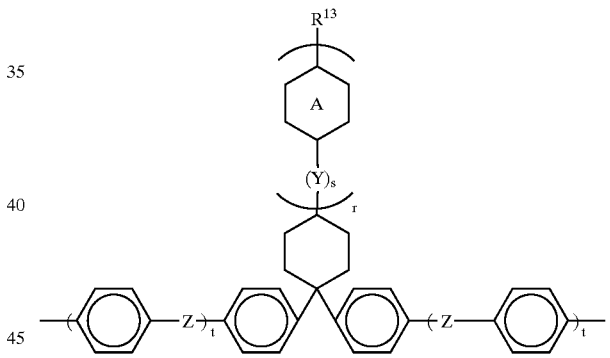
(7)

wherein $R^{13}$ represents hydrogen or an alkyl group having 1 to 12 carbon atoms; Y represents a single bond or —$CH_2$—; a ring A represents a benzene ring or a cyclohexane ring; Z represents a single bond, —$CH_2$—, —$CH_2CH_2$— or oxygen; r is an integer of 0 to 3; s is an integer of 0 to 5; t is an integer of 0 to 3; and when t is 2 to 3, the respective Z's may be the same as or different from each other; and (a) hydrogen (s) on the optional benzene ring or cyclohexane ring may be substituted with a lower alkyl group or Formula (8):

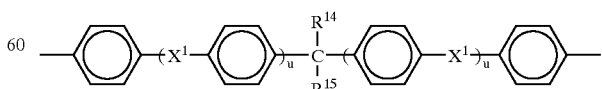
(8)

wherein $X^1$ represents a single bond, —$CH_2$—, —$CH_2CH_2$— or oxygen; $R^{14}$ and $R^{15}$ each resent independently hydrogen or an alkyl group or perfluoroalkyl group having 1 to 12 carbon atoms, and at least one of them represents an alkyl group or perfluoroalkyl group having 3 or more carbon atoms; u is 0 to 3; and when u is 2 to 3, the respective $X^1$'s may be the same as or different from each other, and (a) hydrogen(s) on the optional benzene ring may be substituted with a lower alkyl group.

11. A vanish composition comprising
a polymer composition comprising a polyamic acid represented by Formula (1):

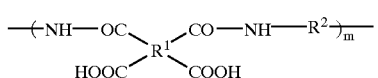

wherein $R^1$ represents a tetravalent organic residue originating in tetracarboxylic acids which is given by removing carboxyl groups, and $R^2$ represents a divalent organic residue originating in diamines which is given by removing amino groups; and a polyamide represented by Formula (2):

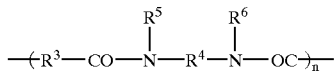

wherein $R^3$ represents a divalent organic residue originating in dicarboxylic acids which is given by removing carboxyl groups; $R^4$ represents a divalent organic residue originating in diamines which is given by removing amino groups; at least one of $R^5$ and $R^6$ represents a group selected from monovalent organic groups, and the other represents hydrogen or a group selected from monovalent organic groups, but when both are groups selected from the organic groups, they may have the same structure or different structures; and
a solvent for dissolving the polymer composition,
wherein the polymer composition contains 1 to 60% by weight of the polyamide represented by Formula (2) based on the polymer composition, and said varnish composition contains 0.1 to 40% by weight of the polymer composition.

12. The varnish composition as described in claim 1, wherein the diamines giving $R^2$ is a diamine comprising an aromatic structural unit alone or an aromatic structural unit and an aliphatic structural unit.

13. The varnish composition as described in claim 11, wherein $R^2$ in Formula (1) is a divalent organic residue originating in a diamine which is given by removing amino groups, represented by Formula (4):

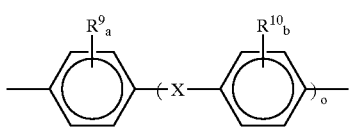

wherein X represents a single bond, —$CH_2$—, —$CH_2CH_2$—, —$CH_2CH_2CH_2$— or —$C(CH_3)_2$—; $R^9$ and $R^{10}$ each represent independently hydrogen or a methyl group; a and b each are 1 to 2, and o is 0 to 3; and when o is 2 to 3, the respective X's may be the same as or different from each other.

14. The varnish composition as described in claim 11, wherein the dicarboxylic acids giving $R^3$ are dicarboxylic acids comprising a unit selected from aromatic, alicyclic and aliphatic ones.

15. The varnish composition as described in claim 11, wherein $R^3$ in Formula (2) is a divalent organic residue originating in a dicarboxylic acid which is given by removing carboxyl acid groups, represented by Formula (5):

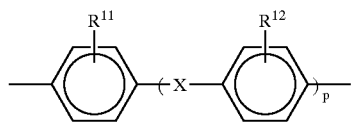

wherein X represents a single bond, —$CH_2$—, —$CH_2CH_2$—, $CH_2CH_2CH_2$— or —$C(CH_3)_2$—; $R^{11}$ and $R^{12}$ each represent independently hydrogen or methyl; p is 0 to 3; and when p is 2 to 3, the respective X's may be the same as or different from each other or Formula (6):

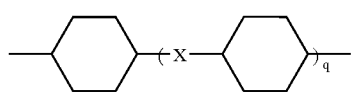

wherein X represents a single bond, —$CH_2$—, —$CH_2CH_2$—, —$CH_2CH_2CH_2$— or —$C(CH_3)_2$—; q is 0 to 3; and when q is 2 to 3, the respective, X's may be the same as or different from each other.

16. The varnish composition as described in claim 11, wherein the diamines giving $R^4$ comprise diamines having a side chain having 3 or more carbon atoms.

17. The varnish composition as described in claim 11, wherein $R^4$ in Formula (2) contains one selected from divalent organic residues originating in diamines which is given by removing amino groups, represented by Formula (7):

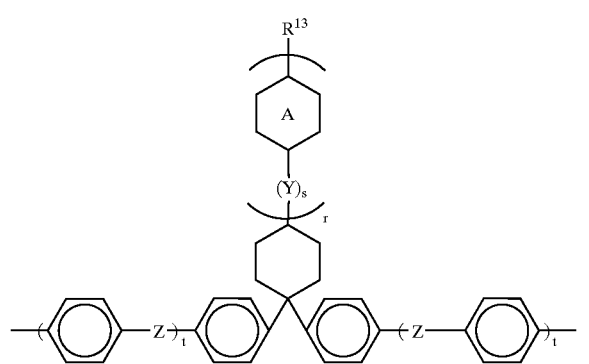

wherein $R^{13}$ resents hydrogen or an alkyl group having 1 to 12 carbon atoms; Y represents a single bond or —$CH_2$—; a ring A represents a benzene ring or a cyclohexane ring; Z represents a single bond, —$CH_2$—, —$CH_2CH_2$— or oxygen; r is an integer of 0 to 3; s is an integer of 0 to 5, t is an integer of 0 to 3; and when t is 2 to 3, the respective Z's may be the same as or different from each other; and (a) hydrogen (s) on tile optional benzene ring or cyclohexane ring may be substituted with a lower alkyl group or Formula (8)

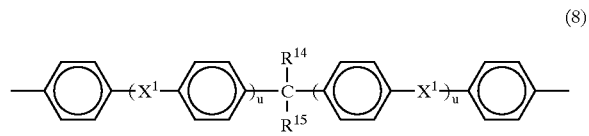

wherein $X^1$ represents a single bond, —$CH_2$—, —$CH_2CH_2$— or oxygen; $R^{14}$ and $R^{15}$ each represent independently hydrogen or an alkyl group or perfluoroalkyl group having 1 to 12 carbon atoms, and at least one of them represents an alkyl group or perfluoroalkyl group having 3 or more carbon atoms; u is 0 to 3; and when u is 2 to 3, the respective $X^1$'s may be the same as or different from each other; and (a) hydrogen(s) on the optional benzene ring may be substituted with a lower alkyl group.

18. The varnish composition as described in claim 11, wherein at least one of $R^5$ and $R^6$ Formula (2) is selected from the group of monovalent organic groups consisting of methyl, ethyl, cyclohexyl, phenyl, benzyl and cyclohexylmethyl.

19. The varnish composition for a liquid crystal alignment film as described in claim 11.

20. A liquid crystal display using the varnish composition as described in claim 19.

* * * * *